(12) United States Patent
Harmon

(10) Patent No.: US 8,514,066 B2
(45) Date of Patent: Aug. 20, 2013

(54) ACCELEROMETER BASED EXTENDED DISPLAY

(75) Inventor: John Paul Harmon, Albany, OR (US)

(73) Assignee: Trimble Navigation Limited, Sunnyvale, CA (US)

( * ) Notice: Subject to any disclaimer, the term of this patent is extended or adjusted under 35 U.S.C. 154(b) by 1713 days.

(21) Appl. No.: 11/818,399

(22) Filed: Jun. 13, 2007

(65) Prior Publication Data
US 2008/0309508 A1  Dec. 18, 2008

Related U.S. Application Data

(63) Continuation-in-part of application No. 11/604,103, filed on Nov. 25, 2006, now abandoned.

(51) Int. Cl.
*G08B 1/08* (2006.01)
*G09G 5/08* (2006.01)

(52) U.S. Cl.
USPC .................................. 340/539.1; 345/163

(58) Field of Classification Search
USPC ...... 340/686.1, 539; 345/156, 163; 715/856; 600/595
See application file for complete search history.

(56) References Cited

U.S. PATENT DOCUMENTS

| | | | |
|---|---|---|---|
| 6,728,632 B2 | 4/2004 | Medl | |
| 7,142,870 B2 | 11/2006 | Kim | |
| 7,159,326 B2 | 1/2007 | Linjama | |
| 7,176,888 B2 * | 2/2007 | Marvit et al. | 345/156 |
| 7,280,096 B2 * | 10/2007 | Marvit et al. | 345/156 |
| 7,301,528 B2 * | 11/2007 | Marvit et al. | 345/156 |
| 7,489,249 B2 | 2/2009 | Better et al. | |
| 7,536,201 B2 * | 5/2009 | Dunko | 455/556.1 |
| 7,606,552 B2 | 10/2009 | Orr et al. | |
| 7,633,389 B2 | 12/2009 | Mantovani et al. | |
| 2003/0119529 A1 | 6/2003 | Hirokawa | |
| 2003/0164822 A1 | 9/2003 | Okada | |
| 2003/0210143 A1 | 11/2003 | Haddad | |
| 2003/0222889 A1 | 12/2003 | Parulski et al. | |
| 2004/0051702 A1 | 3/2004 | Taniguchi et al. | |
| 2004/0105573 A1 | 6/2004 | Neumann et al. | |
| 2004/0192352 A1 | 9/2004 | Vallstrom et al. | |
| 2005/0155240 A1 * | 7/2005 | Kwon et al. | 33/356 |
| 2006/0019706 A1 * | 1/2006 | Ho et al. | 455/556.2 |
| 2007/0001875 A1 * | 1/2007 | Taylor | 340/995.24 |
| 2007/0024578 A1 * | 2/2007 | Lundquist | 345/156 |
| 2007/0107518 A1 * | 5/2007 | Cromer et al. | 73/649 |
| 2007/0192691 A1 * | 8/2007 | Inazumi | 715/700 |
| 2007/0250732 A1 * | 10/2007 | Wong et al. | 713/324 |
| 2008/0234930 A1 | 9/2008 | Cheok et al. | |
| 2008/0266257 A1 * | 10/2008 | Chiang | 345/163 |
| 2010/0106411 A1 | 4/2010 | Nirhamo et al. | |
| 2010/0171642 A1 | 7/2010 | Hassan et al. | |

* cited by examiner

*Primary Examiner* — Benjamin C Lee
*Assistant Examiner* — Sigmund Tang

(57) ABSTRACT

Embodiments of the present invention recite a method and system for displaying data on a portable electronic device. In one embodiment, a first portion of accessed data is displayed on a portable electronic device. A motion detector responsive to motion in at least a single direction then detects a movement of the portable electronic device from a first position to a second position. In response to the motion detector detecting the movement, a second portion of the accessed data is automatically displayed by the portable electronic device.

21 Claims, 10 Drawing Sheets

ACCELEROMETER BASED EXTENDED DISPLAY

RELATED APPLICATIONS

The present application claims priority to and is a continuation-in-part to the U.S.P.T.O. application Ser. No. 11/604,103 filed Nov. 25, 2006 now abandoned titled "Portable Display with Improved Functionality," by Paul H. Harmon, assigned to the assignee of the present invention, and which is hereby incorporated by reference in its entirety herein.

TECHNICAL FIELD

Embodiments in accordance with the present invention generally pertain to portable electronic devices. More particularly, embodiments of the present invention are related to extending the display area of portable electronic devices.

BACKGROUND

Recent technology trends have allowed mobile access of content using cellular telephones, laptop computers, and personal digital assistants (PDAs). As a result, there is a greater demand for content, including online content, which is accessed by mobile devices. However, many users are finding it difficult to access the same content using mobile devices which they can easily access with their desktop computers. In other words, the content that is designed for display on a desktop computer is often not as accessible, or may be incomprehensible, when using a mobile device.

Application and web portal developers have designed their product to be compatible with a desktop computer having certain minimum requirements. This was economically feasible in that they could assume they were accessible to a majority of users who were trying to access their content via desktop computers.

For example, application developers design their content to be compatible with desktop computers because they are the devices used by the majority of users. Thus, the application developer may assume that the content will be viewed upon a desktop computer having a minimum display resolution of 600×800 pixels and running one of the most widely used operating systems and/or web browsers. This assumed operating environment is usually sufficient for the majority of devices accessing their content. The developers may also typically assume the desktop computer uses a mouse and an alpha-numeric keyboard as the user input devices. Web application developers also operated using the similar formatting assumptions.

However, mobile devices utilize displays which have much smaller display capabilities than a typical desktop computer and also a wider variety of operating systems. Because of the greater number of operating environments implemented in the mobile market, it is not economically feasible for application and/or web portal developers to create a different product for each possible environment. Additionally, because the greatest market share is still dedicated to desktop environments, developers still format their products for that operating environment. As a result, entire pages of content (e.g., an e-mail message) that can be displayed upon a desktop computer often cannot be displayed in a usable manner upon mobile devices such as cellular telephones or PDAs. Thus, the users of mobile devices are often required to scroll through the page being displayed in order to find the content which they are seeking. This is often inconvenient for the users and may be difficult due to the small size factors of the devices being used.

In other words, users who can access content from their desktop computers may find it difficult or burdensome to access the same content from a mobile device. Additionally, the limited capabilities of some mobile devices make it difficult or burdensome for some users to edit scroll through the content using their mobile devices.

SUMMARY OF THE INVENTION

Embodiments of the present invention recite a method and system for displaying data on a portable electronic device. In one embodiment, a first portion of accessed data is displayed on a portable electronic device. A motion detector responsive to motion in at least a single direction then detects a movement of the portable electronic device from a first position to a second position. In response to the motion detector detecting the movement, a second portion of the accessed data is automatically displayed by the portable electronic device.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "detecting," "determining," "displaying," or "utilizing," "identifying," "initiating" or the like, refer to the actions and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
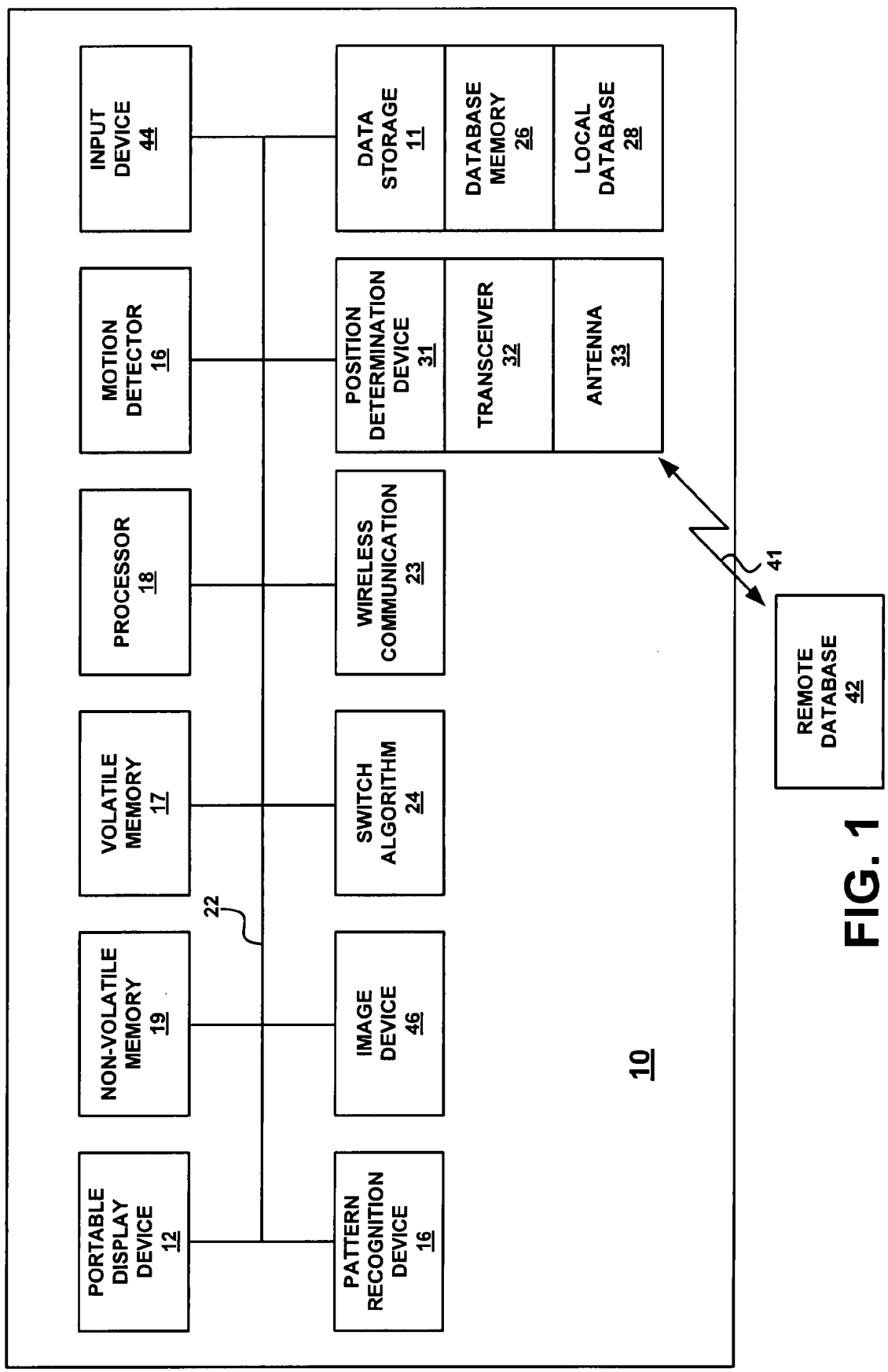
FIG. 1 depicts an apparatus for improving display functionality in accordance with an embodiment of the present invention.

In one embodiment, FIG. 1 depicts an apparatus 10 for improving display functionality in accordance with an embodiment of the present invention.

In one embodiment of the present invention, a portable display 12 is selected from the group consisting of a Personal Digital Assistant (PDA) display; a laptop display; a digital watch display; a cell phone display; a blackberry-type data device display; a digital camera display; and a digital camcorder display. According to Dictionary.com, a Personal Digital Assistant (PDA) is a small hand-held computer typically providing calendar, contacts, and note-taking applications but may include other applications, for example a web browser and a media player. Small keyboards and pen-based input systems are most commonly used for user input.

In an embodiment of the present invention, in order to access a physical area outside a portable display 12, a user moves the portable display 12 in a physical area. The physical area can comprise a line (1D physical area), a plane (2D physical area), or a 3D physical area.

Example I

As an example, a PDA with improved display functionality (according to an embodiment of the present invention) is placed on a financial page of Wall Street Journal. The PDA can read the financial data published on this page when a user moves the device around the page. In other words, upon detecting the movement of the PDA in a given direction, a portion of the financial page in that direction, which was previously not viewable, is displayed on portable display 12. This results in a device having a virtual window that has a size much larger than the physical size of the portable display 12 itself.

Referring still to FIG. 1, in one embodiment of the present invention, the apparatus 10 further comprises a radio-based position determination device 31 further comprising a radio-based transceiver 32 and an antenna 33.

In one embodiment of the present invention, the radio-based position transceiver 32 is selected from the group consisting of: an autonomous satellite receiver; a Virtual Reference Station (VRS)-based differential satellite positioning system receiver; a Wide Area Augmentation Service (WAAS)-based differential satellite positioning system receiver; a Real Time Kinematic (RTK)-based satellite positioning system receiver; an Omni STAR-High Performance (HP)-based differential satellite positioning system receiver; and a pseudolite receiver.

In embodiments of the present invention, radio-based position transceiver 32 comprises a Global Navigation Satellite System (GNSS) transceiver. In embodiments of the present invention, the satellite receiver is selected from the group consisting of: a Global Positioning System (GPS) receiver; a GLONASS receiver, a Global Navigation Satellite System (GNSS) receiver; and a combined GPS-GLONASS receiver.

The Global Positioning System (GPS) is a system of satellite signal transmitters that transmits information from which an observer's present location and/or the time of observation can be determined. The GPS was developed by the United States Department of Defense (DOD) under its NAVSTAR satellite program and is discussed in greater detail in document ICD-GPS-200: GPS Interface Control Document, ARINC Research, 1997, GPS Joint Program Office, which is incorporated by reference herein.

The second satellite-based navigation system is the Global Orbiting Navigation Satellite System (GLONASS), placed in orbit by the former Soviet Union and is now maintained by the Russian Republic.

As disclosed in the European Commission "White Paper on European transport policy for 2010", the European Union is developing an independent satellite navigation system GALILEO as a part of a global navigation satellite infrastructure (GNSS). The specifications for the GALILEO system are well known and embodiments of the present invention are well suited to utilize GALILEO positioning information to determine a geographic position of apparatus 10.

Reference to a radio positioning system (RADPS) herein refers to a Global Positioning System (GPS), to a Global Orbiting Navigation System (GLONASS), to GALILEO System, and to any other compatible Global Navigational Satellite System (GNSS) satellite-based system that provides information by which an observer's position and the time of observation can be determined, all of which meet the requirements of the present invention, and to a ground based radio positioning system such as a system comprising of one or more pseudolite transmitters.

After the RADPS receiver determines the coordinates of i-th satellite by demodulating the transmitted ephemeris parameters, the RADPS receiver can obtain the solution of the set of the simultaneous equations for its unknown coordinates (x0, y0, z0) and for unknown time bias error (cb). The RADPS receiver can also determine velocity of a moving platform.

Referring still to FIG. 1, in one embodiment of the present invention, the position determination component 31 further comprises a differential GPS receiver (not shown). In differential position determination, many of the errors in the RADPS signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms. The differential GPS receiver can include, but is not limited to, (a) a real time code differential GPS; (b) a post-processing differential GPS; (c) a real-time kinematic (RTK) differential GPS that includes a code and carrier RTK differential GPS receiver.

The differential GPS receiver can obtain the differential corrections from different sources. In one embodiment of the present invention, the differential GPS receiver can obtain the differential corrections from a Base Station (not shown). The fixed Base Station (BS) placed at a known location determines the range and range-rate measurement errors in each received GPS signal and communicates these measurement errors as corrections to be applied by local users. The Base Station (BS) has its own imprecise clock with the clock bias CBBASE. As a result, the local users are able to obtain more accurate navigation results relative to the Base Station location and the Base Station clock. With proper equipment, a relative accuracy of 5 meters should be possible at distances of a few hundred kilometers from the Base Station.

In one embodiment of the present invention, the differential corrections can be obtained from the Wide Area Augmentation System (WAAS) by using the wireless communication device (not shown) and the wireless communication link (not shown). The WAAS system includes a network of Base Stations that uses satellites (initially geostationary satellites-GEOs) to broadcast GPS integrity and correction data to GPS users. The WAAS provides a ranging signal that augments the GPS. Thus, the WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm. The WAAS provides the differential corrections free of charge to a WAAS-compatible user. The accuracy of this method is better than 1 meter.

Referring still to FIG. 1, in one embodiment of the present invention, the position determination component 31 comprises a real time kinematic (RTK) differential GPS receiver that can be used to obtain the position locations with less than 2 cm accuracy.

RTK is a process where GPS signal corrections are transmitted in real time from a reference receiver at a known location to one or more remote rover receivers. The use of an RTK capable GPS system can compensate for atmospheric delay, orbital errors and other variables in GPS geometry, increasing positioning accuracy up to within a centimeter. Used by engineers, topographers, surveyors and other professionals, RTK is a technique employed in applications where precision is paramount. RTK is used, not only as a precision positioning instrument, but also as a core for navigation systems or automatic machine guidance, in applications such as civil engineering and dredging. It provides advantages over other traditional positioning and tracking methods, increasing productivity and accuracy. Using the code phase of GPS signals, as well as the carrier phase, which delivers the most accurate GPS information, RTK provides differential corrections to produce the most precise GPS positioning. The RTK process begins with a preliminary ambiguity resolution. This is a crucial aspect of any kinematic system, particularly in real-time where the velocity of a rover receiver should not degrade either the achievable performance or the system's overall reliability.

Referring still to FIG. 1, in one embodiment of the present invention, the position determination component 31 a differential GPS receiver that can obtain the differential corrections from the Virtual Base Station (VBS) (not shown) by using the wireless communication device 23 and the wireless communication link (not shown).

Indeed, the Virtual Base Station (VBS) is configured to deliver a network-created correction data to a multiplicity of rovers via a concatenated communications link consisting of a single cellular connection, and a radio transmission or broadcasting system. The location of the radio transmitting system can be co-located with a GPS Base Station designated as the position of the local Virtual Reference Station. This GPS Base Station determines its position using GPS, and transmits its location to the VRS Base Station via a cellular link between the local GPS Base Station and the VRS Base Station. It enables the VRS Base Station to generate differential corrections as if such differential corrections were actually being generated at the real GPS Base Station location. An article "Long-Range RTK Positioning Using Virtual Reference Stations," by Ulrich Vollath, Alois Deking, Herbert Landau, and Christian Pagels, describing VRS in more details, is incorporated herein as a reference in its entirety, and can be accessed at the following URL: http://trl.trimble.com/dscgi/ds.py/Get/File-93152/KIS2001-Paper-LongRange.pdf.

The Omni STAR-HP (High Performance) solution is a dual frequency GPS augmentation service that provides robust and reliable high performance GPS positioning. By using dual frequency GPS observations, Omni STAR-HP can measure the true ionospheric error at the reference station and user location, substantially eliminating this effect in positioning accuracy. Using these ionospheric-free measurements with other information contained in the GPS receiver carrier phase data, the OmniSTAR-HP solution is able to create a wide area positioning solution of unmatched accuracy and performance in selected areas. Published accuracies are typically 0.2 meter horizontal (Hz) and 0.3 meter vertical (Z).

Referring still to FIG. 1, in one embodiment of the present invention, the position determination component 31 can be implemented by using a pseudolite receiver. The pseudolite comprises a ground based radio positioning system working in any radio frequency including but not limited to the GPS frequencies and the ISM (industrial scientific medical) unlicensed operation band, including 900 MHZ, 2.4 GHz, or 5.8 GHz bands ISM bands, or in a radio location band such as the (9.5-10) GHz band. Pseudolites can be used for enhancing the GPS by providing increased accuracy, integrity, and availability. The complete description of the pseudolite transmitters in GPS band can be found in "Global Positioning System: Theory and Applications; Volume II," edited by Bradford W: Parkinson and James J. Spilker Jr., and published in Volume 164 in "PROGRESS IN ASTRONAUTICS AND AERONAUTICS," by American Institute of Aeronautic and Astronautics, Inc. in 1966.

Pseudolites as radio positioning systems can be configured to operate in ISM band. In ISM band, including 900 MHZ, 2.4 GHz, or 5.8 GHz bands, the user can own both ends of the ISM communication system. The ISM technologies are manufactured by Trimble Navigation Limited, Sunnyvale, Calif., Metricom, Los Gatos, Calif., and by Utilicom, Santa Barbara, Calif.

Referring still to FIG. 1, in one embodiment of the present invention, the apparatus 10 further comprises: a motion detector 16 configured to detect movement of the portable display 12 over the physical area. The motion detector is selected from the group consisting of an accelerometer; a compass; a gyroscope; and an inertial navigation device.

In one embodiment of the present invention, the motion detector 16 can be implemented by using one or more accelerometers that are configured to measure movement of the portable display 12. An accelerometer is a sensor that measures acceleration, speed and distance by mathematically determining acceleration over time.

In one embodiment of the present invention, acceleration of the portable display 12 may be measured in each of three perpendicular directions corresponding to the x, y, and z-axes of a Cartesian coordinate system by using one or more accelerometers. In the embodiment of FIG. 1, the location of the portable display 12 can be obtained by processing the measured acceleration, speed and distance of the portable display by using the processor 18 and a memory block. The processor 18 may be implemented by using a commercially available or custom made microprocessor. The memory may comprise a volatile memory 17, a non-volatile memory 19, and data storage 11, or a combination thereof, and can be implemented by using the following types of devices: cache, ROM, PROM, EPROM, EEPROM, flash, SRAM, and DRAM.

In another embodiment of the present invention, accelerations of the portable display 12 may be measured for six degrees of freedom by using a number of accelerometers, wherein three accelerations may be measured corresponding to the x, y, and z-axes of a Cartesian coordinate system, and wherein three additional accelerations may be measured corresponding to pitch, roll, and rotation.

For example, the motion detector 16 can be implemented by using at least one relatively inexpensive (~$10) accelerometer and having a relatively high resolution (50 micro gravities per root hertz). Accelerometers based on silicon-micro machined MEMS technology exploit the changes in capacitance caused by the relative movement of moving and fixed structures created in the silicon, using wafer-processing techniques. STMicroelectronics (NYSE: STM) manufactures a MEMS-based three-axis accelerometer device LIS3L02D that provides both three-axis sensing in a single package and a digital output. This device is designed primarily for handheld terminals where it can be used to implement a motion-based user interface that is based on hand movements, allowing one-handed operation without styli, thumb keyboards or other input devices. The LIS3L02D includes a single-chip MEMS sensor chip plus a calibrated interface chip that senses changes in capacitance in the sensor and translates them into SPI or I2C serial digital outputs. The LIS3L02D operates on a 2.7 to 3.6V supply voltage. The device has an equivalent noise acceleration of better than 500 millionths of one 'g'. During transport and service it can withstand accelerations up to 3000 g without damage.

In one embodiment of the present invention, the motion detector 16 can be implemented by using a compass configured to provide direction information of the movement of the display 12, and/or gyroscope configured to measure rotational movement of the portable display 12. These two measurements can be used to supplement and/or replace the information obtained by using at least one accelerometer.

In one embodiment of the present invention, the motion detector 16 can be implemented by using an inertial navigation device that can be built by using a combination of accelerometers, magnetometers, a processor, and specifically designed software.

Acceleron Technology, Inc., located in San Francisco, Calif., has built small light weight, inertial navigation device using three accelerometers to measure three components of the local acceleration vector, three magnetometers to measure three components of the local gravitational vector, plus some software.

A magnetometer is a device that measures a local magnetic field. The local gravitational factor can be calculated by using the measured local magnetic field, because the local gravitational field, as well as the local magnetic field, are both defined by the local Earth geometry, as well explained in the book "Applied Mathematics in Integrated Navigation Systems," published by American Institute of Aeronautics and Astronautics, Inc, 2000, by Robert M. Rogers.

Indeed, "Applied Mathematics in Integrated Navigation Systems" teaches how geometrical shape and gravitational models for representing the Earth are used to provide relationship between ECEF position x-y-z components and local-level latitude, longitude, and attitude positions. "Applied Mathematics in Integrated Navigation Systems" also teaches how a moving person's, or object's, position change in geographical coordinates is related to the local Earth relative velocity and Earth curvature. "Applied Mathematics in Integrated Navigation Systems" also teaches how to develop the functional characteristics of inertial sensors used in navigation systems, how to develop the time-varying dynamic error models for inertial sensors random errors. "Applied Mathematics in Integrated Navigation Systems" is incorporated herein in its entirety.

Thus, in one embodiment of the present invention, the processor 18 is configured to process a set of positional data related to the portable display 12 based on the acceleration data adjusted for the local gravitational factor provided by the inertial navigation device 16.

Referring still to FIG. 1, in one embodiment of the present invention, the motion detector 16 further comprises a pattern recognition device 16 configured to detect movement of the portable display 12 over the selected physical area. In one embodiment of the present invention, the pattern recognition device 16 is selected from the group consisting of a digital camera; a digital camcorder; and an optical mouse.

The concept of pattern has emerged from sensorial perception. A set of perceptual measurements of the visual or auditory system that is "easily" recognizable is traditionally referred to as a pattern. Images of random pixels would not be considered "patterns" while images of simple line shapes like characters would. The so-called "raw data" is the set of measurements provided by a sensor (e.g. the pixels of an image provided by a digital camera). The main steps of the pattern recognition process are pre-processing and feature extraction that may include some signal processing such as smoothing and noise filtering and the extraction of higher level features for which human knowledge about the task is essential.

Referring still to FIG. 1, in one embodiment of the present invention, the pattern recognition device 16 (implemented by using a digital camera) can obtain a sequence of images of the background surrounding the portable display 12, whereas the processor 18 and memory (pre-loaded with the pattern recognition software) can perform the task of detecting movement of the portable display 12.

Similarly, in one embodiment of the present invention, the pattern recognition device 16 (implemented by using a camcorder) can obtain a sequence of video images of the background surrounding the portable display 12. Again, the processor 18 and memory (pre-loaded with the pattern recognition software) can perform the task of detecting movement of the portable display 12.

In one more embodiment of the present invention, the pattern recognition device 16 (implemented by using an optical mouse) can obtain a sequence of videos images of the background surrounding the portable display 12.

The optical mouse developed by Agilent Technologies, actually uses a tiny camera to take 1,500 pictures every second. Able to work on almost any surface, the mouse has a small, red light-emitting diode (LED) that bounces light off that surface onto a complementary metal-oxide semiconductor (CMOS) sensor. The CMOS sensor sends a each image to a digital signal processor (DSP) for analysis. The DSP, operating at 18 MIPS (million instructions per second), is able to detect patterns in the images and see how those patterns have moved since the previous image. Based on the change in patterns over a sequence of images, the DSP determines how far the mouse has moved and sends the corresponding coordinates to the computer.

For the purposes of the present invention, the pattern recognition device 16 can be implemented by using an optical mouse, wherein the processor 18 is configured to perform the DSP operations to detect movement of the portable display 12.

Referring still to FIG. 1, in one embodiment, the apparatus 10 of the present invention further comprises an image device 46 configured to obtain a plurality of images of the background of the selected physical area. In one embodiment of the present invention, the image device 46 is selected from the group consisting of a digital camera; and a digital camcorder. A digital camera, as well as a digital camcorder, is a device well-known to a person skilled in the art. In one embodiment of the present invention, the processor 18 is configured to process the plurality of images of the selected physical area obtained by the image device 46 and to store them in the memory.

Referring still to FIG. 1, in one embodiment, the apparatus 10 of the present invention further comprises the data storage memory 11 coupled to the processor 18 via the bus 22 further comprising the database memory 26 and the local database 28.

In one embodiment of the present invention, the local database 28 is pre-loaded with data related to the selected physical area. In one example, the local database 28 is pre-loaded with the images of buildings to be built in the selected physical area. In another example, the local database 28 is pre-loaded with the existing buildings and streets (with addresses and names on them) located in the selected physical area.

In one embodiment of the present invention, the processor 18 is programmed to select and extract from the local database 28 a set of data related to the selected physical area, and to store this set of data in the database memory 26. The processor 18 communicates with the database memory 26 via the address/data bus 22.

In one embodiment of the present invention, the processor 18 is configured to send to the input device 44 a set of images of the selected physical area obtained by the image device 46 and stored in the memory.

In another embodiment of the present invention, the processor 18 is configured to superimpose a set of data stored in the database memory 26 (obtained from the local database 28 and related to selected physical area) on the set of images of the physical area obtained by the image device 46 and stored in the memory and to send this set of superimposed data to the input device 44.

Referring still to FIG. 1, in one embodiment, the apparatus of the present invention 10 is configured to display selected portions of an image. In this embodiment of the present invention, the database 28 includes a database of scale-factors, and the processor 18 is configured to map a set of scale factors to a set of reference points in a displayed view of the image. In this embodiment of the present invention, the processor 18 is also configured to interpret relative position changes in the display device 12 to control a viewing point in the mage, relative to a reference point on the image. In this embodiment of the present invention, the processor 18 is also configured to select a particular scale factor from the database of the scale-factors, and to access a particular part of the displayed view of the image according to the selected scale factor.

In one embodiment, referring still to FIG. 1, the apparatus 10 of the present invention further includes the wireless communication device 23 configured to communicate with the remote database 42 by using the wireless link 41. The wireless link 41 can be implemented by using a wireless link selected from the group consisting of, a cellular link; a radio link; a private radio band link; a SiteNet 900 private radio network link; a link to the wireless Internet; and a satellite wireless communication link.

In one embodiment of the present invention, the processor 18 is programmed to select and extract from the remote database 42 a set of data related to the selected physical area by using the wireless communication device 23 and place this set of data in the database memory 26.

In one embodiment of the present invention, the processor 18 is configured to superimpose a set of data stored in the database memory 26 (obtained from the remote database 42 and related to selected physical area) on the set of images of the physical area obtained by the image device 46, and to send this set of superimposed data to the input device 44.

In one embodiment of the present invention, the input device 44 is programmed to input data to the portable display 12 by using the switch algorithm 24 that is connected to the processor 18 via bus 22.

In one embodiment of the present invention, the switch algorithm 24 (of FIG. 1) comprises at least the following steps: if the portable display 12 moves in the plane substantially perpendicular to the Earth's gravitational field, the portable display 12 displays a set of images related to the selected physical area; if the portable display 12 moves in the plane substantially parallel with the Earth's gravitational field, the portable display 12 displays a set of superimposed data obtained from the remote (or the local database) on a set of images of the selected physical area.

More specifically, in the first mode of operation of the present invention, the display 12 is flying (by a user) as a "virtual window" over an unlimited "full display" physical area. The image device 46 is configured to obtain the images of the background of the physical area while the motion detector 16 (or pattern recognition detector 16) detects movement of the portable display. This gives the user access to a view that is physically larger than the view made possible by the size of the unit.

In the second mode of operation of the present invention, the display 12 pays attention to all three dimensions (3D) of the input. When the display 12 device is flying (by a user) as a "virtual window" over an unlimited physical area perpendicular to the Earth's gravitational field, it operates in a "full display" physical area mode described in the paragraph above.

On the other hand, when the display 12 is moved up into a position substantially parallel with the Earth's gravitational field, it switches to a mode that paints a data filled picture of the user's surroundings. More specifically, the user could access images derived from a database, either from the remote database 42, or from the local database 28. In one embodiment, these images can be superimposed on the natural background of the physical area.

In one embodiment of the present invention, referring still to FIG. 1, the portable display 12 can be selected from the group consisting of a time display; a 1D display; a 2D display; a 3D display; a (1D+time) display; a (2D+time) display; and a (3D+time) display.

Example V

A "time display" is essentially a recording device with improved functionality that is configured to record the set of images of the selected physical area per se, and/or the set of images corresponding to the selected physical area and superimposed on the set of images of the selected physical area.

Example VI

A "1D display" is a linear real time display with improved functionality that is configured to display the set of linear images (data) of the selected physical area per se, and/or the set of linear images (data) corresponding to the selected physical area and superimposed on the set of linear images (data) of the selected physical area.

Example VII

A "2D display" is a 2D real time display with improved functionality that is configured to display the set of 2D images (and/or data) of the selected physical area per se, and/or the set of 2D images (and/or data) corresponding to the selected physical area and superimposed on the set of 2D images (and/or data) of the selected physical area.

Example VIII

A "3D display" is a 3D real time display with improved functionality that is configured to display the set of (2D images+data) of the selected physical area per se, and/or the set of (2D images+data) corresponding to the selected physical area and superimposed on the set of (2D images+data) of the selected physical area.

Example IX

A "1D+time" display is a linear real time display with improved functionality plus with recording capabilities, that is configured: (A) to display in real time the set of linear images (data) of the selected physical area per se; or (B) to record and display later in time the set of linear images (data) of the selected physical area per se; or (C) to display in real time the set of linear images (data) corresponding to the selected physical area and superimposed on the set of linear images (data) of the selected physical area; or (D) to record and display later in time the set of linear images (data) corresponding to the selected physical area and superimposed on the set of linear images (data) of the selected physical area.

Example X

A "2D+time" display is a 2D real time display with improved functionality plus with recording capabilities, that is configured: (A) to display in real time the set of 2D images of the selected physical area per se; or (B) to record and display later in time the set of 2D images of the selected physical area per se; or (C) to display in real time the set of 2D images corresponding to the selected physical area and superimposed on the set of 2D images of the selected physical area; or (D) to record and display later in time the set of 2D images corresponding to the selected physical area and superimposed on the set of 2D images of the selected physical area.

Example XI

A "3D+time" display is a 3D real time display with improved functionality plus with recording capabilities, that is configured: (A) to display in real time the set of (2D images+data) of the selected physical area per se; or (B) to record and display later in time the set of (2D images+data) of the selected physical area per se; or (C) to display in real time the set of (2D images+data) corresponding to the selected physical area and superimposed on the set of 2D images of the selected physical area; or (D) to record and display later in time the set of (2D images+data) corresponding to the selected physical area and superimposed on the set of 2D images of the selected physical area.

In one embodiment, the method of the present invention to improve the functionality of the portable display can be performed by using the apparatus 10 of FIG. 1.

Figure 2:
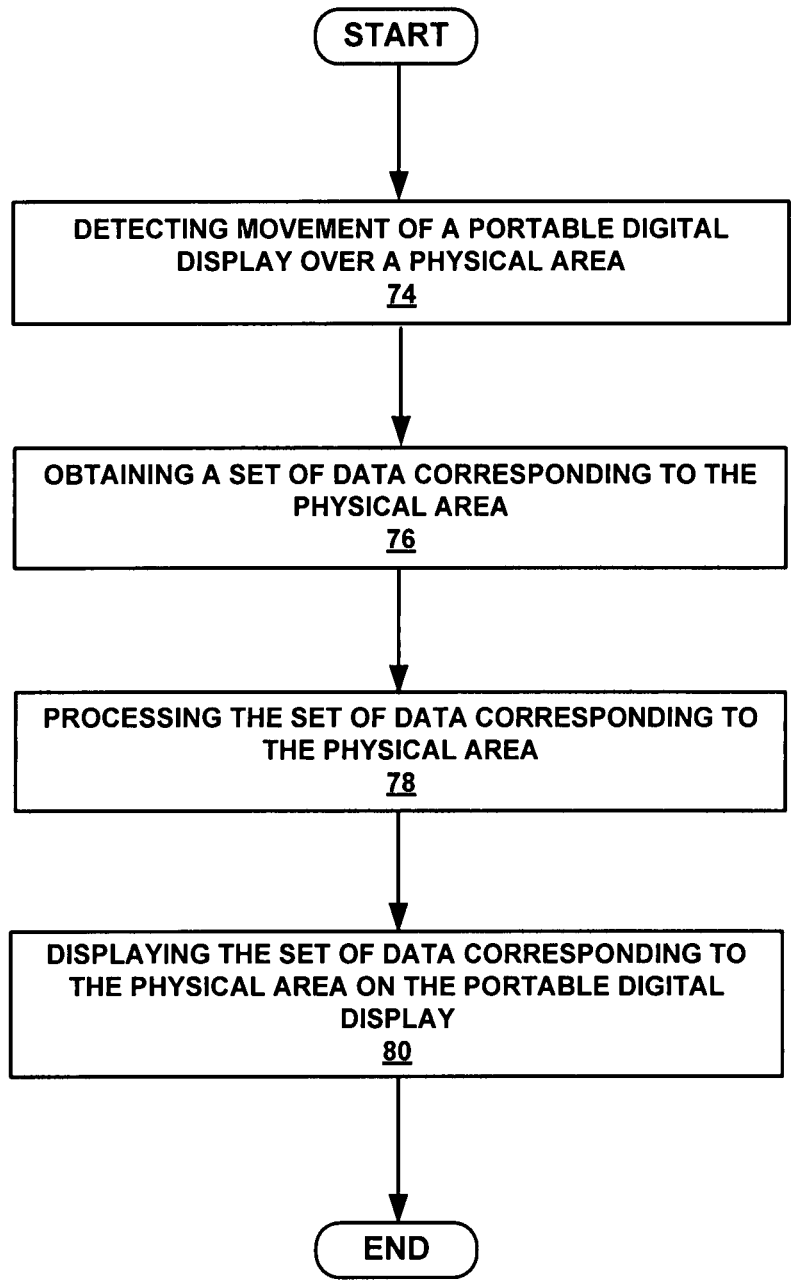
FIG. 2 illustrates the basic steps of a method for improving display functionality in accordance with embodiment of the present invention.

FIG. 2 illustrates the basic steps of the method 70 of the present invention for improving display functionality comprising: (A) detecting movement of the portable display 12 over the selected physical area (step 74); (B) obtaining a set of data related to the selected physical area (step 76); (C) processing the set of data related to the selected physical area (step 78); and (D) displaying the set of data related to the physical area on the portable display 12 (step 80).

In one embodiment of the present invention, the step (A) further comprises (not shown): (A1) using a motion detector (of FIG. 1) to detect movement of the portable display 12 over the selected physical area. In another embodiment of the present invention, the step (A) further comprises: (A2) using a pattern recognition device (16 of FIG. 1) to detect movement of the portable display 12 over the selected physical area.

In one embodiment of the present invention, the step (A) further comprises (not shown): (A4) selecting the portable display from the group consisting of a Personal Digital Assistant (PDA) display; a laptop display; a digital watch display; a cell phone display; a blackberry-type data device display; a digital camera display; and a digital camcorder display.

In one embodiment of the present invention, the step (A1) further comprises (not shown): (A1, 1) selecting the motion detector (of FIG. 1) from the group consisting of an accelerometer; a compass; a gyroscope; and an inertial navigation device.

In one embodiment of the present invention, the step (A2) further comprises (not shown): (A2, 1) selecting the pattern recognition device (16 of FIG. 1) from the group consisting of a digital camera; a digital camcorder; and an optical mouse.

In one embodiment of the present invention, the step (B) further comprises (not shown): (B1) obtaining a set of images of objects located in the physical area by using the image device (46 of FIG. 1) attached to the portable display (12 of FIG. 1); wherein the image device is selected from the group consisting of a digital camera; and a digital camcorder.

In one embodiment of the present invention, the step (B) further comprises (not shown): (B2) obtaining a set of data from a database, wherein the set of data from the database is related to the selected physical area. In one embodiment of the present invention, the step (B2) further comprises (not shown): (B2, 1) programming the processor (18 of FIG. 1) to select and extract from the local database (28 of FIG. 1) a set of data related to the selected physical area.

In one embodiment of the present invention, the step (B2) further comprises (not shown): (B2, 2) programming the processor (18 of FIG. 1) to communicate with the remote database (42 of FIG. 1) by using the wireless communication device (23 of FIG. 1) and to select and extract from the remote database (42 of FIG. 1) a set of data related to the selected physical area.

In one embodiment of the present invention, the step (C) further comprises (not shown): (C2) processing a set of data obtained from the local database (28 of FIG. 1); and (C3) mapping the set of data obtained from the local database (28 of FIG. 1) to the selected physical area. The step of mapping can be performed by using the processor 18 of FIG. 1.

In one embodiment of the present invention, the step (C) further comprises (not shown): (C4) superimposing the set of data obtained from the local database (28 of FIG. 1) and mapped to the selected physical area on the set of images of the selected physical area.

In one embodiment of the present invention, the step (C) further comprises (not shown): (C5) processing a set of data obtained from the remote database (42 of FIG. 1), and (C6) mapping the set of data obtained from the remote database to the selected physical area.

In one embodiment of the present invention, the step (C) further comprises (not shown): (C7) superimposing the set of data obtained from the remote database (42 of FIG. 1) on the set of images of the physical area.

In one embodiment of the present invention, the step (D) further comprises (not shown): (D1) selecting the portable display (12 of FIG. 1) from the group consisting of: {a time display; a 1D display; a 2D display; a 3D display; a (1D+time) display; a (2D+time) display; and a (3D+time) display}.

Figure 3:
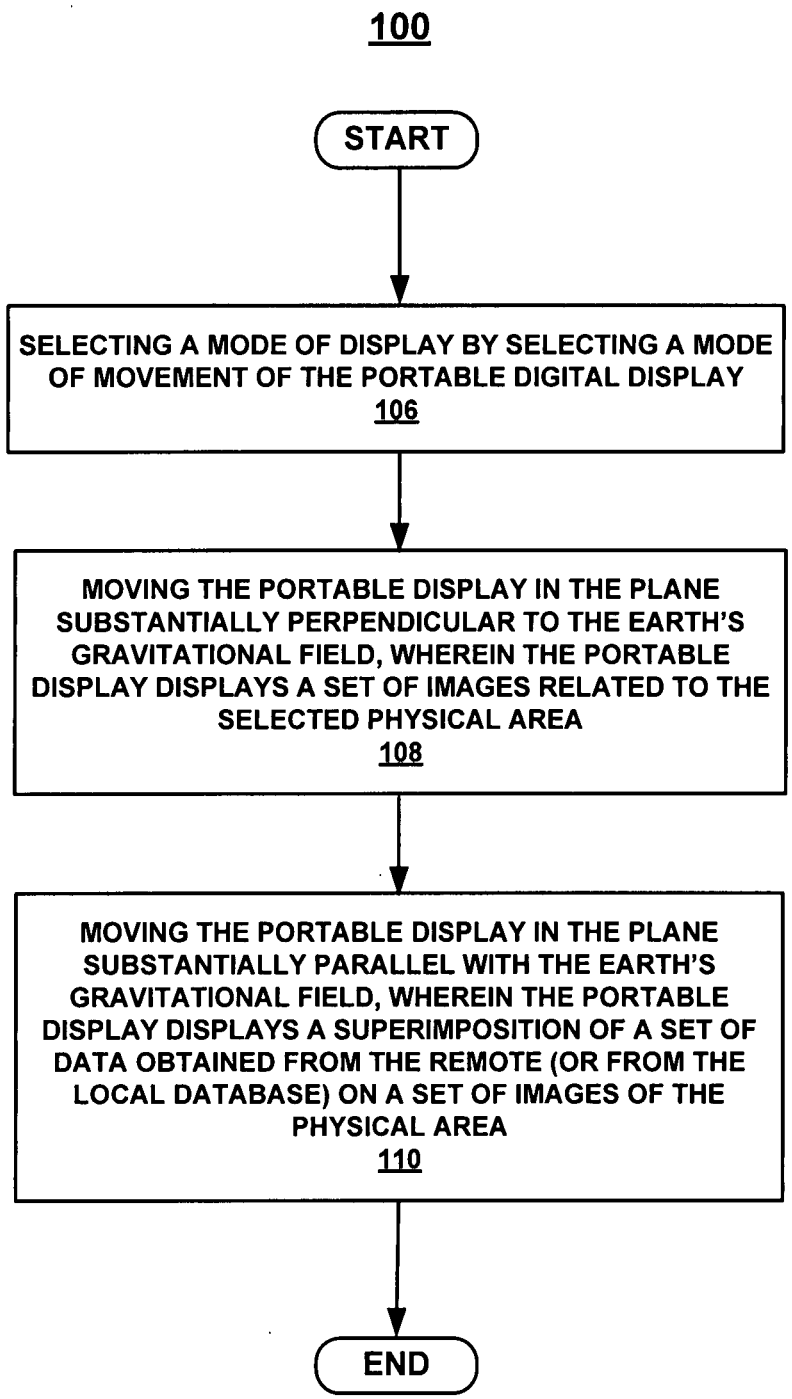
FIG. 3 is a flow chart of an exemplary switch algorithm that is configured to select a mode of operation of an apparatus for improving display functionality in accordance with embodiments of the present invention.

FIG. 3 is a flow chart 300 of the switch algorithm of the present invention that is configured to select a mode of operation of the apparatus (10 of FIG. 1) of the present invention for improving display functionality.

In one embodiment of the present invention, the step (D) further comprises: (D2) (step 106 of FIG. 3) selecting a mode of display by selecting a mode of movement of the portable display.

In one embodiment of the present invention, the step (D2) further comprises: (D2, 1) (step 108 of FIG. 3) moving the portable display in the plane perpendicular to the Earth's gravitational field, wherein the portable display displays a set of images related to the selected physical area.

In another embodiment of the present invention, the step (D2) further comprises: (D2, 2) (step 110 of FIG. 3) moving the portable display in the plane parallel with the Earth's gravitational field, wherein the portable display displays a superimposition of a set of data obtained from the remote (or from the local database) on a set of images of the physical area.

In one embodiment, the method of the present invention of viewing selected portions of an image can be performed by using the apparatus 10 of FIG. 1.

In one embodiment, the method of the present invention for viewing selected portions of an image comprises (not shown): (A) providing an image to be viewed; (B) providing the display device (12 of FIG. 1) configured to view at least a part of the image; (C) providing the motion detector (14 of FIG. 1) in the display device; and (D) providing the processor (18 of FIG. 1) for interpreting position change detected by the motion detector to access a different part of the displayed view of the image.

In one embodiment of the present invention, the step (D) further comprises: (D1) mapping a set of scale factors to a set of reference points in a displayed view of the image by using the processor 18 and the memory; and (D2) accessing a particular part of the displayed view of the image according to a scale factor mapped to the particular reference point on the image.

Figure 4:
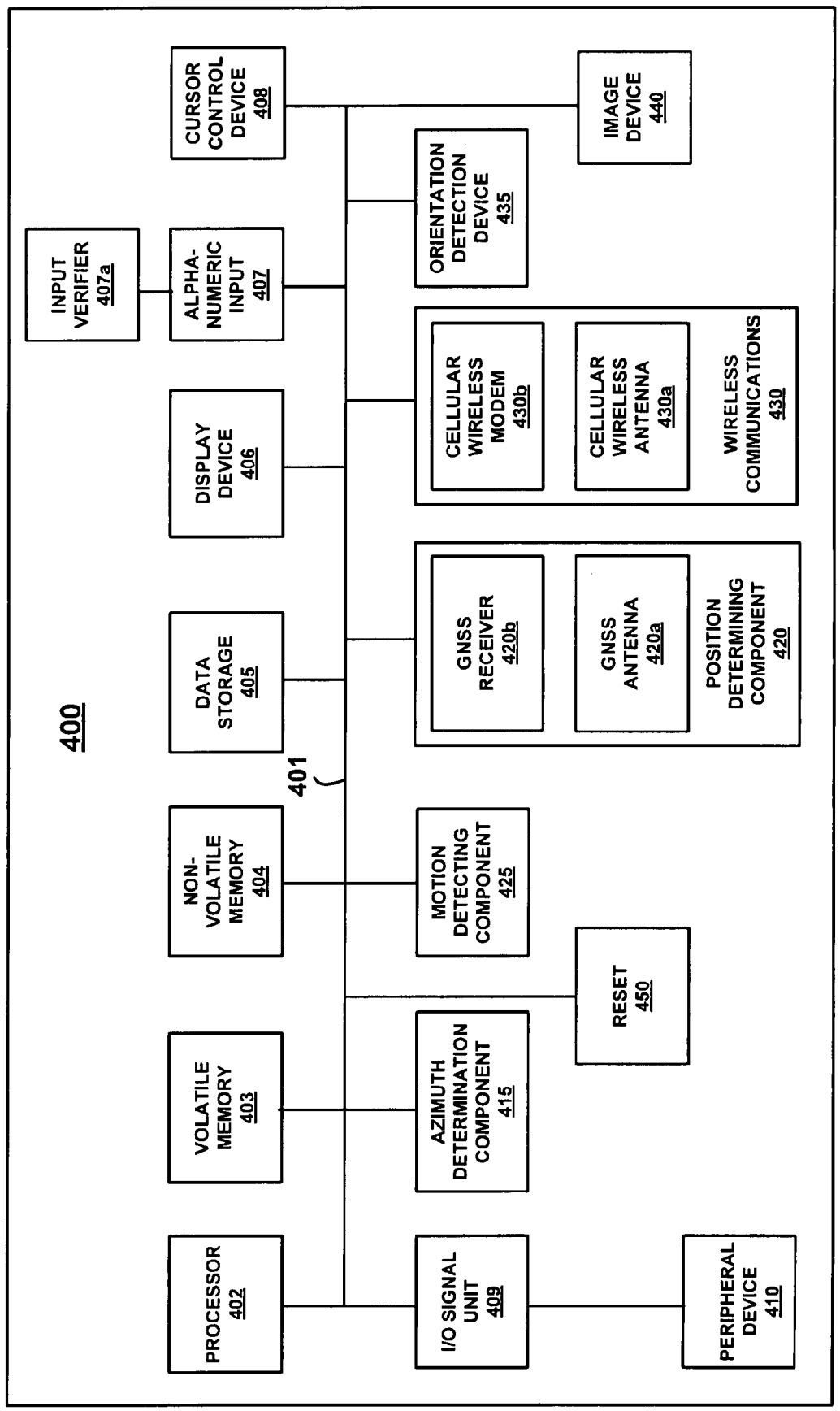
FIG. 4 is a block diagram of an exemplary portable electronic device in accordance with embodiments of the present invention.

FIG. 4 is a block diagram of an exemplary portable electronic device in accordance with embodiments of the present invention. In the present embodiment, portable electronic device 400 comprises an address/data bus 401 for conveying digital information between the various components, a central processor unit (CPU) 402 for processing the digital information and instructions, a volatile main memory 403 is comprised of volatile random access memory (RAM) for storing the digital information and instructions, and a non-volatile read only memory (ROM) 404 for storing information and instructions of a more permanent nature. In addition, portable electronic device 400 may also include a data storage device 405 (e.g., a magnetic, optical, floppy, or tape drive or the like) for storing vast amounts of data. It should be noted that the software program for performing the accelerator based extended display of the present invention can be stored in volatile memory 403, data storage device 405, or in an external storage device (not shown).

Additional devices comprising portable electronic device 400 include a display device 406 for displaying information to a user, an optional alpha-numeric input device 407 (e.g., a keyboard), and an optional cursor control device 408 (e.g., mouse, trackball, light pen, etc.) for inputting data, selections, updates, etc. Portable electronic device 400 can also include a mechanism for emitting an audible signal (not shown).

Returning still to FIG. 4, display device 406 of FIG. 4 may be a liquid crystal device, cathode ray tube, or other display device suitable for creating graphic images and alpha-numeric characters recognizable to a user. Cursor control device 408 allows the computer user to dynamically signal the two dimensional movement of a visible symbol (cursor) on a display screen of display device 406. Many implementations of cursor control device 408 are known in the art including a trackball, mouse, touch pad, joystick, or special keys on alpha-numeric input 407 capable of signaling movement of a given direction or manner displacement. Alternatively, it will be appreciated that a cursor can be directed and/or activated via input from alpha-numeric input 407 using special keys and key sequence commands. Alternatively, the cursor may be directed and/or activated via input from a number of specially adapted cursor directing devices.

Furthermore, portable electronic device 400 can include an input/output (I/O) signal unit (e.g., interface) 409 for interfacing with a peripheral device 410 (e.g., a computer network, modem, mass storage device, etc.).

Azimuth determination component 415 is for determining a horizontal angle, relative to portable electronic device 400, from a reference direction (e.g., magnetic north, or true north) to an object. In embodiments of the present invention, azimuth determination component 415 may detect variations in the Earth's magnetic field, or may utilize a gyroscope to determine true north.

Position determining component 420 is for determining the location of portable electronic device 400. In embodiments of the present invention, position determining component 420 comprises a GPS antenna 420*a* and a GPS receiver 420*b*. More generally, position determining component is operable to utilize Global Navigation Satellite System (GNSS) radio signals to determine the geographic position of portable electronic device 400. However, while the present embodiment specifically recites a GNSS position determining component, embodiments of the present invention are well suited to utilize a variety of terrestrial-based and satellite-based position determining components as well. In embodiments of the present invention, the geographic position determined by position determining component 420 describes the latitude and longitude of portable electronic device 400. However, position determining component 420 may also determine the elevation of portable electronic device in embodiments of the present invention.

A motion detecting component 425 is for detecting a change in the motion of portable electronic device 400. Thus, if portable electronic device is essentially stationary, a motion of portable electronic device 400 along at least one plane of motion, as opposed to motion around a point (e.g., roll, pitch, or yaw), is detected by motion detecting component 425. Alternatively, if portable electronic device 400 transitions from a moving state to a substantially stationary state, this transition is detected by motion detecting component 425. In embodiments of the present invention, motion detecting component 425 generates a signal in response to detecting a change in the motion of portable electronic device 400. In embodiments of the present invention, motion detecting component 425 comprises an accelerometer operable for determining motion of portable electronic device 400 in at least two directions (e.g., along the X and Y axes). In another embodiment of the present invention, motion detecting component 425 comprises an accelerometer operable for determining motion of portable electronic device 400 in three planes of motion which are conventionally defined as an X, Y, and Z axis. In embodiments of the present invention, the signal generated by motion detecting component 425 indicates a vector from the original position of portable electronic device 400 to a second position of portable electronic device 400. As will be discussed in greater detail below, processor 402 causes a second portion of accessed data, such as a document, to be displayed by display device 406 in response to this signal. It is noted that in embodiments of the present invention, motion detecting component 425 may comprise a plurality of accelerometers, each of which determines the motion of portable electronic device 400 in a respective axis.

A wireless communications component 430, comprising a wireless antenna 430a and a cellular wireless modem 430b, is also coupled with bus 401. Wireless communications component 430 is for transmitting and receiving wireless messages (e.g., data and/or commands). In embodiments of the present invention, wireless communication component 430 is compliant with the Global System for Mobile Communications (GSM) specification. While the present invention recites a GSM compliant wireless communication device, other wireless communication specifications, such as the Global Packet Radio Service (GPRS) specification, may be utilized in embodiments of the present invention. In one embodiment, portable electronic device 400 sends and receives messages using the Short Message Service (SMS). However, the present invention is well suited to utilize other message formats as well.

In other embodiments of the present invention, wireless communications component 430 may comprise a Bluetooth wireless communications device, or another wireless communications device such as a Wi-Fi transceiver. Wi-Fi transceivers are often used to create local area networks between a portable computer and an Internet access point in public areas such as airports, coffee shops, libraries, and the like. Alternatively, many cellular telephone providers also provide wireless Internet services using communication devices known as "air cards" which refer to wireless communication devices which allow electronic devices to pick up wireless radio signals in a manner similar to a cellular telephone. One type of air card couples with a PCMCIA Type 2 card slot of a portable computer system and facilitates establishing a wireless Internet connection when installed. Thus, in one embodiment, wireless communication device 430 comprises an air card.

Also shown in FIG. 4 is an orientation detection device 435 which is coupled with bus 401. In embodiments of the present invention, orientation detection device 435 determines the orientation of portable electronic device 400 relative to the Earth's service. In embodiments of the present invention, orientation detection device 435 generates a first signal when portable electronic device 400 is oriented substantially parallel to the surface of the Earth (e.g., horizontally), and generates a second signal when portable electronic device 400 is oriented substantially vertical to the surface of the Earth.

Also shown in FIG. 4 is an input verifier 407a which is coupled with alpha-numeric input 407. In embodiments of the present invention, input verifier 407a allows a user to indicate when motion of portable electronic device 400 is to be considered an input for displaying a second portion of accessed data. As will be described in greater detail below, embodiments of the present invention detect a change in orientation when portable electronic device 400 is moved from a first position to a second position. In one embodiment, this is accomplished using motion detecting component 425. However, if a user is operating portable electronic device 400 while moving, (e.g., walking, in a moving vehicle, boat, airplane, etc.) the motion associated with the movement of the user may be detected by motion detecting component 425 and mistakenly interpreted as an input by the user. In embodiments of the present invention, the user of portable electronic device 400 utilizes input verifier 407a to indicate motion of portable electronic device 400 which the user is intentionally performing in order to initiate a desired task.

In another embodiment of the present invention, a user can utilize a reset initiator (e.g., reset 450) to reset the displayed data in response to unintentional motion detected by motion detecting component 425. Thus, if a second portion of accessed data is displayed in response to motion of the user of portable electronic device 400, as opposed to user motion of portable electronic device 400, the user can reset the display. In one embodiment, the display resets to the middle of the accessed data (e.g., the middle of an accessed news page). In another embodiment, the user can designate the reset point. For example, the user could designate the upper left hand corner as the default reset position. In another embodiment, portable electronic device may reset to the last portion of accessed data prior to the most recent detection of motion. In one embodiment, if a portion of currently accessed data has been displayed for at least a minimum amount of time, that portion will become the reset position. Thus, if inadvertent motion causes a second portion of data to be displayed, the user could hit the reset button to cause the last accessed data to be displayed again.

Figure 5:
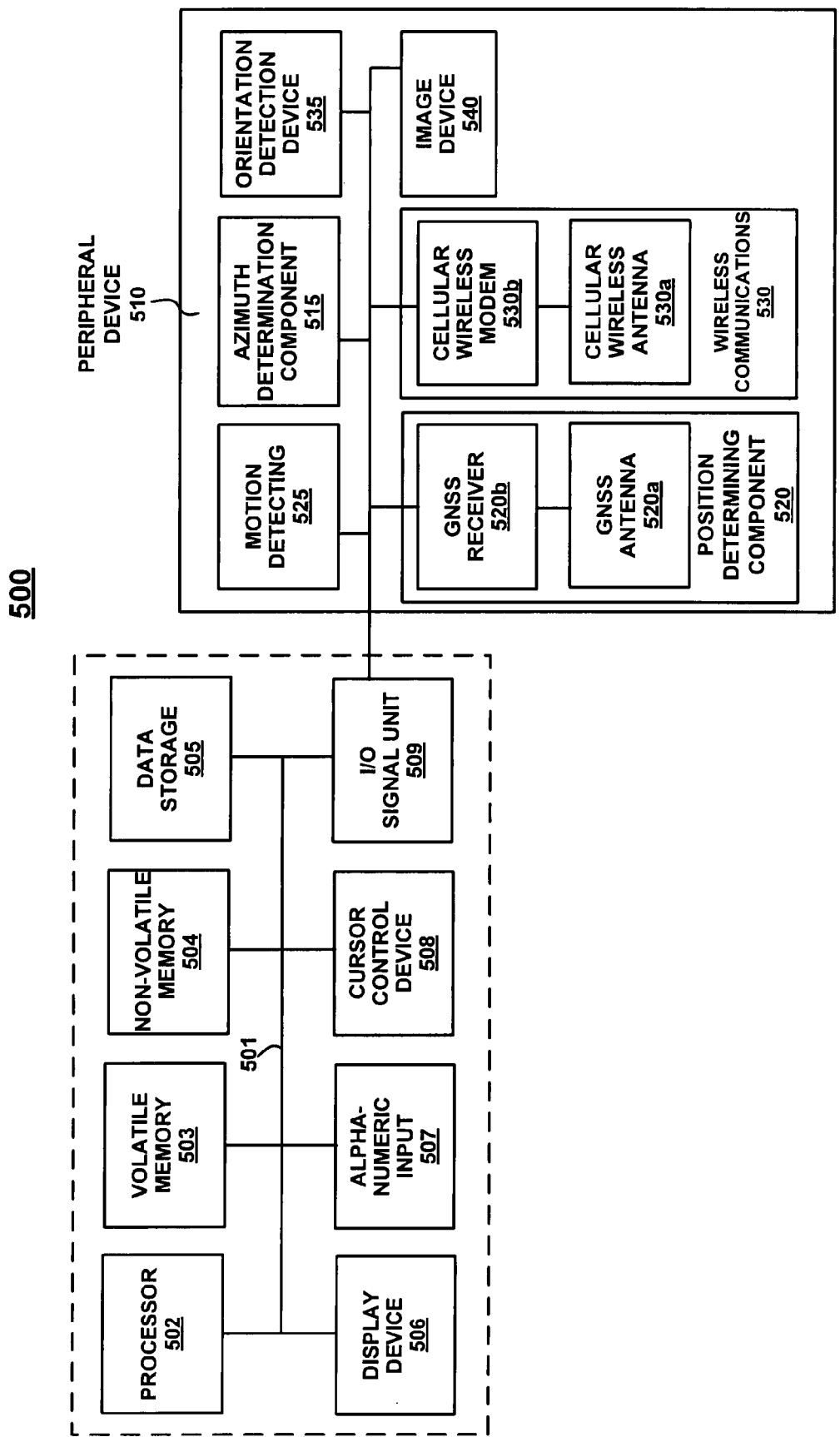
FIG. 5 is a block diagram of another exemplary portable electronic device in accordance with embodiments of the present invention.

FIG. 5 is a block diagram of an exemplary portable electronic device 500 which can be used in accordance with embodiments of the present invention. In the present embodiment, portable electronic device 500 comprises an address/data bus 501 for conveying digital information between the various components, a central processor unit (CPU) 502 for processing the digital information and instructions, a volatile main memory 503 comprised of volatile random access memory (RAM) for storing the digital information and instructions, and a non-volatile read only memory (ROM) 504 for storing information and instructions of a more permanent nature. In addition, portable electronic device 500 may also include a data storage device 505 (e.g., a magnetic, optical, floppy, or tape drive or the like) for storing vast amounts of data. It should be noted that the software program for performing the accelerator based extended display of the present invention can be stored in volatile memory 503, data storage device 505, or in an external storage device (not shown).

Additional devices comprising portable electronic device 500 include a display device 506 for displaying information to a user, an optional alpha-numeric input device 507 (e.g., a keyboard), and an optional cursor control device 508 (e.g., mouse, trackball, light pen, etc.) for inputting data, selections, updates, etc. Portable electronic device 500 can also include a mechanism for emitting an audible signal (not shown).

Returning still to FIG. 5, display device 506 of FIG. 5 may be a liquid crystal device, cathode ray tube, or other display device suitable for creating graphic images and alpha-numeric characters recognizable to a user. Cursor control device 508 allows the computer user to dynamically signal the two dimensional movement of a visible symbol (cursor) on a display screen of display device 506. Many implementations of cursor control device 508 are known in the art including a trackball, mouse, touch pad, joystick, or special keys on alpha-numeric input 507 capable of signaling movement of a given direction or manner displacement. Alternatively, it will be appreciated that a cursor can be directed and/or activated via input from alpha-numeric input 507 using special keys and key sequence commands. Alternatively, the cursor may be directed and/or activated via input from a number of specially adapted cursor directing devices.

Furthermore, portable electronic device 500 can include an input/output (I/O) signal unit (e.g., interface) 509 for interfacing with a peripheral device 510 (e.g., a computer network, modem, mass storage device, etc.). In embodiments of the present invention, interface 509 may comprise a wired (e.g., serial, parallel, USB, firewire, etc.) interface, or a wireless (e.g., optical, infrared, or radio interface). Examples of a radio interface used in accordance with embodiments of the present invention include, but are not limited to, a Bluetooth® interface, a Wi-Fi communication interface, and the like.

In the embodiment of FIG. 5, peripheral device 510 comprises a position determining component 520, an azimuth determination component 515, a motion detecting component 525, wireless communications component 530, and orientation determining component 535.

Position determining component 520 is for determining the location of portable electronic device 500. In embodiments of the present invention, position determining component 520 comprises a GPS antenna 520a and a GPS receiver 520b. More generally, position determining component is operable to utilize Global Navigation Satellite System (GNSS) radio signals to determine the geographic position of portable electronic device 500. However, while the present embodiment specifically recites a GNSS position determining component, embodiments of the present invention are well suited to utilize a variety of terrestrial-based and satellite-based position determining components as well. In embodiments of the present invention, the geographic position determined by position determining component 520 describes the latitude and longitude of portable electronic device 500. However, position determining component 520 may also determine the elevation of portable electronic device in embodiments of the present invention.

Azimuth determination component 515 is for determining a horizontal angle, relative to portable electronic device 500, from a reference direction (e.g., magnetic north, or true north) to an object. In embodiments of the present invention, azimuth determination component 515 may detect variations in the Earth's magnetic field, or may utilize a gyroscope to determine true north.

A motion detecting component 525 is for detecting a change in the motion of portable electronic device 500. Thus, if portable electronic device is essentially stationary, a motion of portable electronic device 500 along a plane of motion, as opposed to motion around a point (e.g., roll, pitch, or yaw), is detected by motion detecting component 525. Alternatively, if portable electronic device 500 transitions from a moving state to a substantially stationary state, this transition is detected by motion detecting component 525. In embodiments of the present invention, motion detecting component 525 generates a signal in response to detecting a change in the motion of portable electronic device 500. In embodiments of the present invention, motion detecting component 525 comprises an accelerometer operable for determining motion of portable electronic device 400 in at least two directions (e.g., along the X and Y axes). In another embodiment of the present invention, motion detecting component 525 comprises an accelerometer operable for determining motion of portable electronic device 500 in three planes of motion which are conventionally defined as an X, Y, and Z axis. In embodiments of the present invention, the signal generated by motion detecting component 525 indicates a vector from the original position of portable electronic device 500 to a second position of portable electronic device 500. As will be discussed in greater detail below, processor 502 causes a second portion of accessed data, such as a document or picture, to be displayed by display device 506 in response to this signal. It is noted that in embodiments of the present invention, motion detecting component 425 may comprise a plurality of accelerometers, each of which determines the motion of portable electronic device 400 in a respective axis.

A wireless communications component 530, comprising a cellular wireless antenna 530a and a cellular wireless modem 530b, is also coupled with bus 501. Wireless communications component 530 is for transmitting and receiving wireless messages (e.g., data and/or commands). In embodiments of the present invention, wireless communication component 530 is compliant with the Global System for Mobile Communications (GSM) specification. While the present invention recites a GSM compliant wireless communication device, other wireless communication specifications, such as the Global Packet Radio Service (GPRS) specification, may be utilized in embodiments of the present invention. In one embodiment, portable electronic device 500 sends and receives messages using the Short Message Service (SMS). However, the present invention is well suited to utilize other message formats as well.

In other embodiments of the present invention, wireless communications component 530 may comprise a Bluetooth wireless communications device, or another wireless communications device such as a Wi-Fi transceiver. Wi-Fi transceivers are often used to create local area networks between a portable computer and an Internet access point in public areas such as airports, coffee shops, libraries, and the like. Alternatively, many cellular telephone providers also provide wireless Internet services using communication devices known as "air cards" which refer to wireless communication devices which allow electronic devices to pick up wireless radio signals in a manner similar to a cellular telephone. One type of air card couples with a PCMCIA Type 2 card slot of a portable computer system and facilitates establishing a wireless Internet connection when installed. Thus, in one embodiment, wireless communication device 530 comprises an air card.

Also shown in FIG. 5 is an orientation detection device 535 which is coupled with bus 501. In embodiments of the present invention, orientation detection device 535 determines the orientation of portable electronic device 500 relative to the Earth's service. In embodiments of the present invention, orientation detection device 535 generates a first signal when portable electronic device 500 is oriented substantially parallel to the surface of the Earth (e.g., horizontally), and generates a second signal when portable electronic device 500 is oriented substantially vertical to the surface of the Earth. It is noted that peripheral device 510 may comprise additional components such as an input verifier (not shown) as described above with reference to FIG. 4.

Figure 6A:
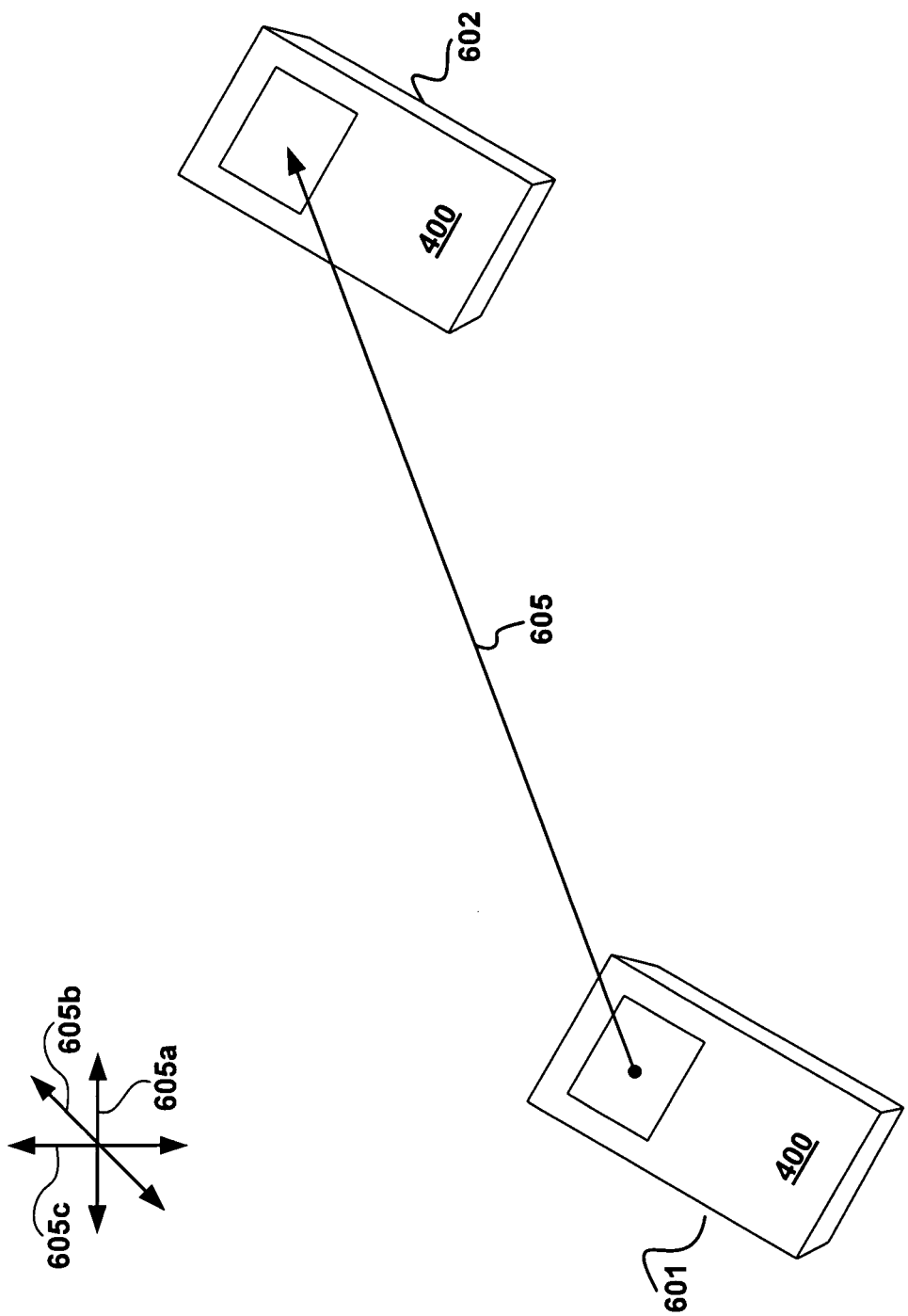
FIG. 6A is a perspective view of a portable electronic device used in accordance with embodiments of the present invention.

FIG. 6A is a perspective view of a portable electronic device 400 used in accordance with embodiments of the present invention. In FIG. 6A, portable electronic device (e.g., portable electronic device 400 of FIG. 4 or portable electronic device 500 of FIG. 5) is displaced from a first position 601 to a second position 602. In so doing, a vector 605 from first position 601 to second position 602 is created. In embodiments of the present invention, vector 605 can be described as having a component which corresponds to an X-axis 605a, a Y-axis 605b, and an optional Z-axis 605c. In embodiments of the present invention, motion detecting component 425, and motion detecting component 525, detect the motion of portable electronic device 400 in at least two of these axes of motion (e.g., along X-axis 605a and Y-axis 605b) and determines vector 605 based upon that information. As described above, in embodiments of the present invention, motion detecting component 425 and motion detecting component 525 are accelerometers operable to determine the direction and distance between first position 601 and second position 602. In embodiments of the present invention, upon determining the direction and distance in which portable electronic device 400 is moved when displaced from first position 601 to second position 602, motion detecting component 425 and motion detecting component 525 generate a signal which conveys this information. As will be described in greater detail below with reference to FIG. 6B, this information is used by portable electronic device 400 to display a second portion of accessed data.

Figure 6B:
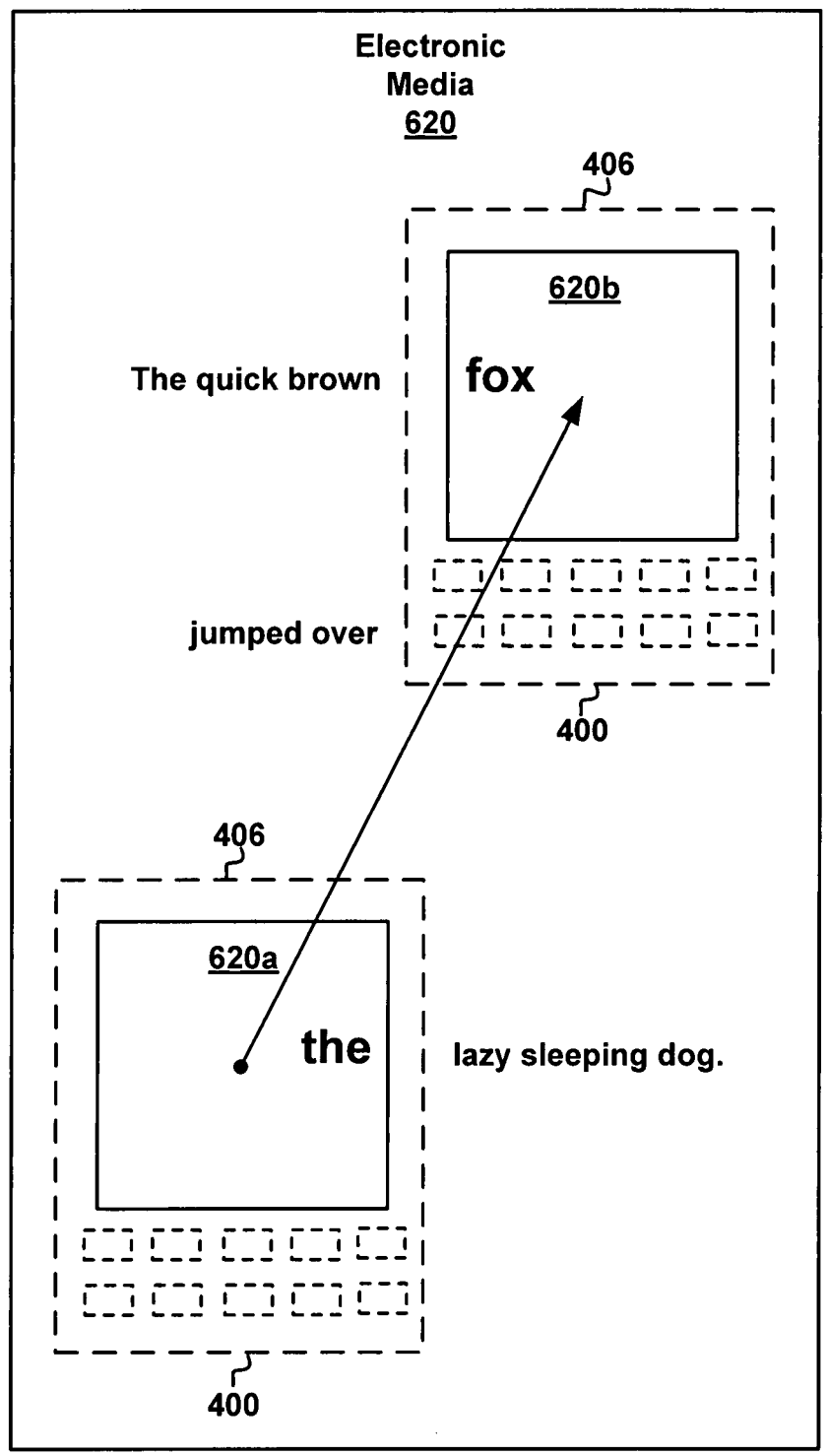
FIG. 6B shows accessed portions of accessed data which are displayed in accordance with embodiments of the present invention.

FIG. 6B shows accessed portions of data which are displayed in accordance with embodiments of the present invention. In FIG. 6B, an instance of accessed data 620 is shown. In embodiments of the present invention, accessed data 620 may comprise a text document, web page, picture, media file, graphical interface, etc.). In embodiments of the present invention, when portable electronic device 400 accesses data 620, it stores data 620 in a memory device (e.g., volatile memory 403, non-volatile memory 404, data storage device 405, etc.). As described above, many portable electronic devices utilize a display screen having a smaller form factor than the displays typically used by a desktop computer. Thus, electronic media which is formatted for the larger display areas of a desktop computer display may be incomprehensible when displayed on the smaller display device of a portable electronic device (e.g., device 400 of FIG. 4). Alternatively, only a portion of the accessed electronic media may be displayed in order to make the accessed media legible to a user. As a result, the user has to manually scroll through the media, or access multiple pages thereof, in order to see all of the media. In embodiments of the present invention, rather than displaying all of data 620, portable electronic device 400 displays a first portion 620a of data 620. In the present invention, the font size, and other display parameters of first portion 620a are pre-set such that first portion 620a in a manner that is legible to a typical user. However, the display parameters of first portion 620a may be user defined as well. It is noted that in embodiments of the present invention, which portion of data 620 is displayed when first accessed may be a default setting (e.g., upper left hand corner, center of a document, etc.), or may be a user defined location.

In embodiments of the present invention, in response to the signal generated by motion detecting component 425 indicating the direction and distance portable electronic device 400 has been moved, portable electronic device will automatically display a second portion 620b of data 620. In embodiments of the present invention, a vector 330 originating at first portion 620a is created when the second portion 620b of data 620 is accessed. In embodiments of the present invention, vector 330 is scaled to represent the direction of vector 605. However, the magnitude of vector 330 is only a fraction of the magnitude of vector 605.

Figure 7:
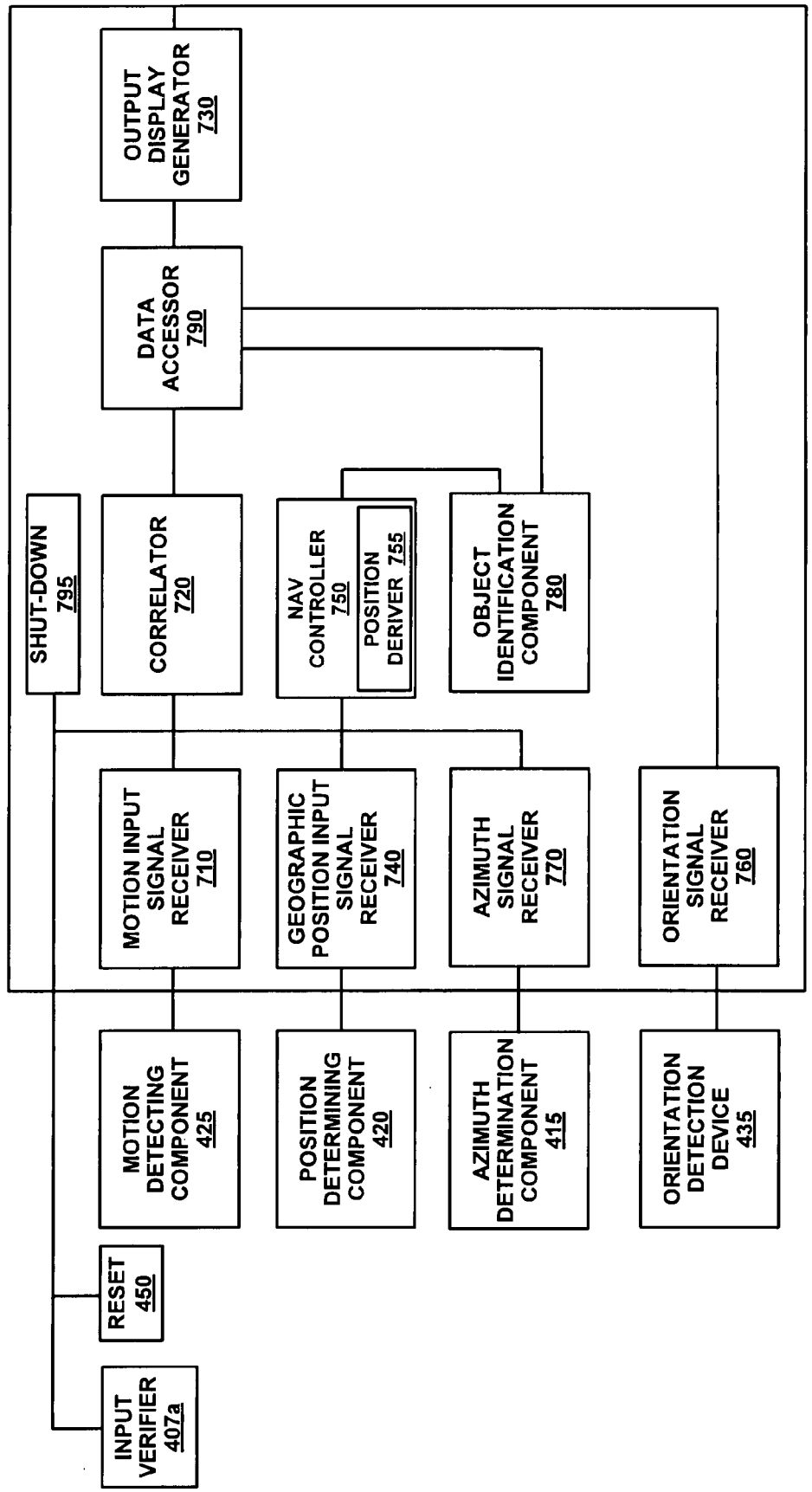
FIG. 7 is a block diagram of an exemplary electronic data accessing device in accordance with embodiments of the present invention.

Referring now to FIG. 7, a block diagram of an exemplary electronic data accessing system 700 in accordance with embodiments of the present invention is shown. In embodiments of the present invention, the functionality of electronic data accessing system 700 may be performed by processor 402. Alternatively, electronic data accessing system 700 may be a separate component of a portable electronic device 400 than processor 402 (e.g., a separate hardware and/or firmware component), or a plurality of components of portable electronic device 400. In embodiments of the present invention, electronic data accessing system 700 accesses software instructions stored in, for example, volatile memory 403, or non-volatile memory 404.

In FIG. 7, system 700 comprises a motion input signal receiver 710 coupled with a motion input detector (e.g., motion detecting component 425) and with a correlator 720. In the present embodiment, correlator 720 is further coupled with output display generator 730 via a data accessor 790. In the embodiment of FIG. 7, motion input signal receiver 710 is further coupled with a shut-down initiator (e.g., Shut-down 795). System 700 further comprises a geographic position input signal receiver 740 coupled with a position determining component 420 and with a navigation controller (e.g., Nav Controller 750). System 700 further comprises an azimuth signal receiver 770 coupled with azimuth determination component 415 and with navigation controller 750. In the embodiment of FIG. 7, navigation controller 750 is coupled with an object identification component 780 which is also coupled with data accessor 790. Data accessor 790 is further coupled with orientation signal receiver 760. While the following discussion of system 700 will cite portable electronic device 400 specifically, it is appreciated that the portable electronic device 500 of FIG. 5 may also implement system 700 as well.

In embodiments of the present invention, motion input signal receiver 710 receives a motion input signal generated by motion detecting component 425 in response to detecting movement of a portable electronic device from a first position to a second position along a plane of motion. In embodiments of the present invention, the motion input signal conveys the vector components of a movement of portable electronic device 400 from, for example, first position 601 to second position 602. It is again noted that motion detecting component 425 does not detect motion around X-axis 605a, Y-axis 605b, and Z-axis 605c. Thus, it does not detect roll, pitch, and or yaw movements of portable electronic device 400 around a point. Instead, motion detecting component 425 detects the motion of portable electronic device 400 along these axes.

Embodiments of the present invention provide a more intuitive feel for users who want to navigate data 620 than tilt sensing devices may provide. For example, it may be less natural for a user to want to tilt portable electronic device 400 in a direction to display a second portion of accessed data. This is especially true if the user has to tilt portable electronic device 400 away in order to access a desired portion of the accessed data. However, in embodiments of the present invention, the user does not have to tilt portable electronic device 400 out of plane in order to access a different portion of accessed data. Thus, it may be more comfortable for some users to utilize embodiments of the present invention.

In embodiments of the present invention, correlator 720 correlates the position of portable electronic device 400 with a portion of the accessed data 620. For example, a presently displayed portion of data (e.g., first portion 620a) is correlated with first position 601, and a second portion of data (e.g., second portion 620b) to be displayed in response to the movement of portable electronic device 400 is correlated to second position 602. As described above, in embodiments of the present invention, the entire instance of accessed data (e.g., an electronic document) is stored in memory (e.g., volatile memory 403, non-volatile memory 404, or data storage device 405). Based upon the display capabilities of the portable electronic device 400 (e.g., display device 406 of FIG. 4), the first portion 620a of the accessed data 620 is displayed. In response to the vector signal generated by motion detecting component 425, correlator 720 determines the second portion 620b of accessed data 620 to be displayed by display device 406. In other words, correlator 720 determines a relationship between second vector 405 in response to receiving the data describing vector 605. It is noted that the relative scale between vector 605 and vector 405 may be a pre-set parameter, or a user selected value. For example, a movement of portable electronic device 400 of one half meter in a given direction may initiate a corresponding shift of the displayed portion of data 620 of 400 pixels in a similar direction as viewed by a user. Thus, the X-axis component and the Y-axis component of vector 605 are translated into an X-axis component and Y-axis component of vector 405. In response to determining vector 405, correlator 720 determines which portion of data 620 (e.g., 620b) will be accessed in response to movement of portable electronic device 400 from first position 601 to second position 602.

Additionally, in embodiments of the present invention, correlator 720 interprets movement of portable electronic device 400 along Z-axis 605c (e.g., an up or down movement relative to portable electronic device 400) as an indication by a user to zoom in/out of the displayed portion of data 620 (e.g., 620a). For example, if a user lifts portable electronic device 400 up along Z-axis 605c, the indication of this vector component causes output display generator 730 to initiate a change in the display properties of the displayed portion of data 620 such that the font size is increased (e.g., from 12 point to 16 point). This gives the user the impression that they are zooming in on the accessed portion of the accessed data. Alternatively, if the user moves portable electronic device 400 down along Z-axis 605c, output display generator 730 may change the display properties of the displayed portion of data 620 such that the font size is decreased (e.g., from 12 point to 9 point). This gives the user the impression that they are zooming out from the accessed data.

In embodiments of the present invention, the geographic position of portable electronic device 400 may be determined using motion detecting component 425 in conjunction with position determining component 420. For example, position determining component 420 may determine the geographic position (e.g., latitude and longitude) of portable electronic device 400 when located at first position 601. This data is input to navigation controller 750 via geographic position input signal receiver 740. Then, when portable electronic device 400 is moved to second position 602, motion detecting component 425 determines the vector (e.g., 605) between first position 601 and second position 602. This data is input to navigation controller 750 via motion input signal receiver 710. Using position deriver 755, navigation controller 750 then determines the geographic position (e.g., latitude and longitude) of portable electronic device 400 at second position 602 by combining the latitude and longitude data from first position 601 in conjunction with vector 605. In embodiments of the present invention, portable electronic device 400 may determine its geographic position automatically upon determining that it has been moved beyond a threshold distance. In one embodiment, this determination may be made by motion detecting component 425. For example, if motion detecting component 425 determines that portable electronic device 400 had been moved 10 meters, it may be assumed that the user is no longer trying to control which portion of data 620 is being displayed. Thus, portable electronic device 400 may automatically begin determining its geographic position in response to determining that is has moved beyond a threshold distance. It is appreciated that this threshold distance may be a pre-set or user determined parameter in embodiments of the present invention.

The combination of a motion detecting component (e.g., 425) in conjunction with a GNSS-based position determining component (e.g., 420) is advantageous in situations in which the GNSS satellite signals may be obscured. For example, if portable electronic device 400 is moved indoors, or beneath a tree, the radio signals from orbiting satellites may be fully or partially blocked. As determining the geographic position of portable electronic device 400 may take far longer, or become entirely impossible. However, embodiments of the present invention the geographic position of portable electronic device 400 may still be determined when the signal from the GNSS satellites is obscured using data from motion detecting component 425.

In embodiments of the present invention, portable electronic device 400 may also determine when it is being dropped and initiate a shut down routine in response. For example, motion detecting component 425 may determine that portable electronic device 400 has moved downward along Z-axis 605c beyond a threshold distance and/or in excess of a threshold rate, it may generate a signal which indicates that portable electronic device 400 is being dropped. In response to receiving this signal, shut-down initiator 795, or processor 402 may initiate a shut-down routine to reduce the damage incurred by portable electronic device 400 when it is dropped.

Also shown in FIG. 7 is an input verifier 407a. As described above, input verifier 407a is for allowing a user to indicate when motion of portable electronic device 400 is to be considered an input for displaying a second portion of accessed data. This prevents system 700 from interpreting movement of the user as an input event, as opposed to a movement of system 700 itself. For example, system 700 may interpret a detected movement as an input to display a second portion of accessed data, or to display a second instance of data, etc. However, if the user of system 700 is seated in a moving vehicle, boat, airplane, or is simply operating system 700 while walking, the movement of the user could be interpreted as an input. This could even occur when the user is not actually intentionally moving system 700 in order to initiate a desired task. In other words, without some indication that a given motion of system 700 is in fact an input event, unintentional movement of system 700 could be interpreted as an input.

As a result, embodiments of the present invention utilize input verifier 407a to facilitate distinguishing between a valid input event and a stray, or unintended, movement of system 700. In one embodiment, a user depresses a button while making a valid input motion of system 700. In so doing, system 700 interprets detected movements as user input while the button is depressed. In response, correlator 720 will determine which portion of accessed data is to be displayed due to the detected movement. When the user releases the button, correlator 720 will not interpret detected movement as a valid input event. In another embodiment, the user depresses the button and releases it to indicate when valid input motion of system 700 is occurring and depresses and releases the button again to indicate when detected movement of system 700 is not a valid input event.

In another embodiment, when a user depresses a button (e.g., input verifier 407a) system 700 "freezes" the display of output display generator 730. Thus, any detected movement of system 700 will not result in a change of the displayed data shown by, for example, display device 406. When the user wants to indicate a valid input event, the user depresses the button again to indicate to system 700 that detected motion is to be considered a valid input event.

In another embodiment, the user utilizes a second motion detecting component in communication with system 700 to indicate when the user is in motion. For example, a user of system 700 may wear or carry a peripheral device (e.g., 410 of FIG. 4) comprising an accelerometer coupled with a Bluetooth device which is communicatively coupled with I/O signal unit 409. Alternatively, the accelerometer may be a component of another electronic device such as a cellular phone, PDA, etc. When the accelerometer of the peripheral device detects movement of the user, this detected movement may be subtracted from the motion detected by motion detecting component 425 in order to determine whether the user is moving, or if the user is moving system 700 as a valid input event.

Figure 8:
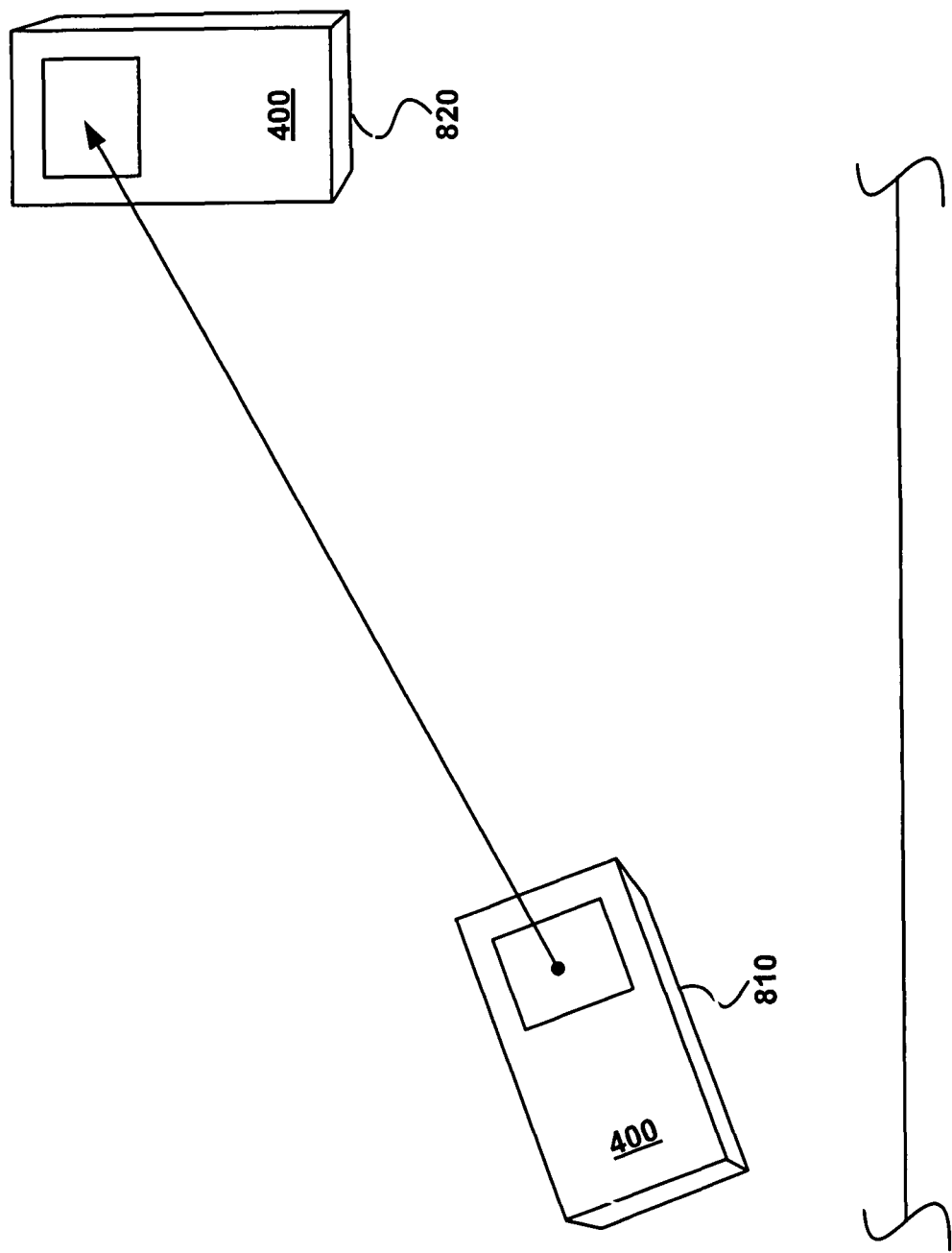
FIG. 8 is a perspective view of a portable electronic device used in accordance with embodiments of the present invention.

FIG. 8 is a perspective view of a portable electronic device used in accordance with embodiments of the present invention. In the embodiment of FIG. 8, a user has moved portable electronic device 400 from a substantially horizontal orientation 810 to a substantially vertical orientation 820 with reference to the Earth's surface. In embodiments of the present invention, this movement is detected by orientation detection device 435 which generates a signal indicating the orientation of portable electronic device 400 to, for example, data accessor 790 via orientation signal receiver 760. In embodiments of the present invention, in response an indication that portable electronic device has been moved from a substantially horizontal orientation to a substantially vertical orientation, or vice versa, data accessor 790 will cause a second instance of data to be displayed.

For example, when portable electronic device 400 is disposed in horizontal orientation 810, it may be displaying a map on display device 406. However, in response to detecting that portable electronic device 400 is now disposed in vertical orientation 820, portable electronic device 400 may automatically display a picture of an object (e.g., a building, terrain feature, etc.) at which portable electronic device 400 is pointing. This is possible by using position determining component 420 to determine the present geographic position of portable electronic device 400, or by a combination of geographic position and vector data as described above with reference to FIG. 7. It is noted that the selection of the second instance of data to be displayed may be a user determined parameter, or may be dependant upon what first instance of data is currently being displayed.

In the embodiment of FIG. 6, navigation controller 750 receives azimuth data indicating a direction which portable electronic device 400 is pointed via azimuth signal receiver 770. Using this information, as well as the current geographic position of portable electronic device 400, object identification component 780 can determine an object (e.g., a manmade object, terrain feature, etc.) at which portable electronic device 400 is pointed. In one embodiment, object identification component 780 comprises a locally stored database (e.g., either locally stored in volatile memory 403, or data storage device 405) which facilitates determining an object at which portable electronic device 400 is pointed. After the object has been identified, data accessor 790 may access a second instance of data about that object. For example, if object identification component 780 determines that portable electronic device 400 is pointed at the Statue of Liberty, data accessor 790 may access a media file, (e.g., pictures, audio files, or multimedia files) with additional data about the Statue of Liberty.

In another embodiment, object identification component 489 may be a remotely located database which is accessed via wireless communications component 430. For example, portable electronic device 400 can send its current geographic position and azimuth to a remote computer system (not shown) which accesses the database that determines the object at which portable electronic device 400 is pointed, and sends an image file of that object back to portable electronic device 400 for displaying. In embodiments of the present invention, determination of which instance of data to display based upon the orientation of portable electronic device 400 is made by display controller 720 in response to a parameter stored, for example, in volatile memory 403, non-volatile memory 404, or data storage device 405. It is appreciated that the parameter which states the data to display depending upon the orientation of portable electronic device 400 may be a default setting, or a user determined parameter in embodiments of the present invention. It is appreciated that the second instance of data about an object may be remotely accessed as well using wireless communication component 430.

Figure 9:
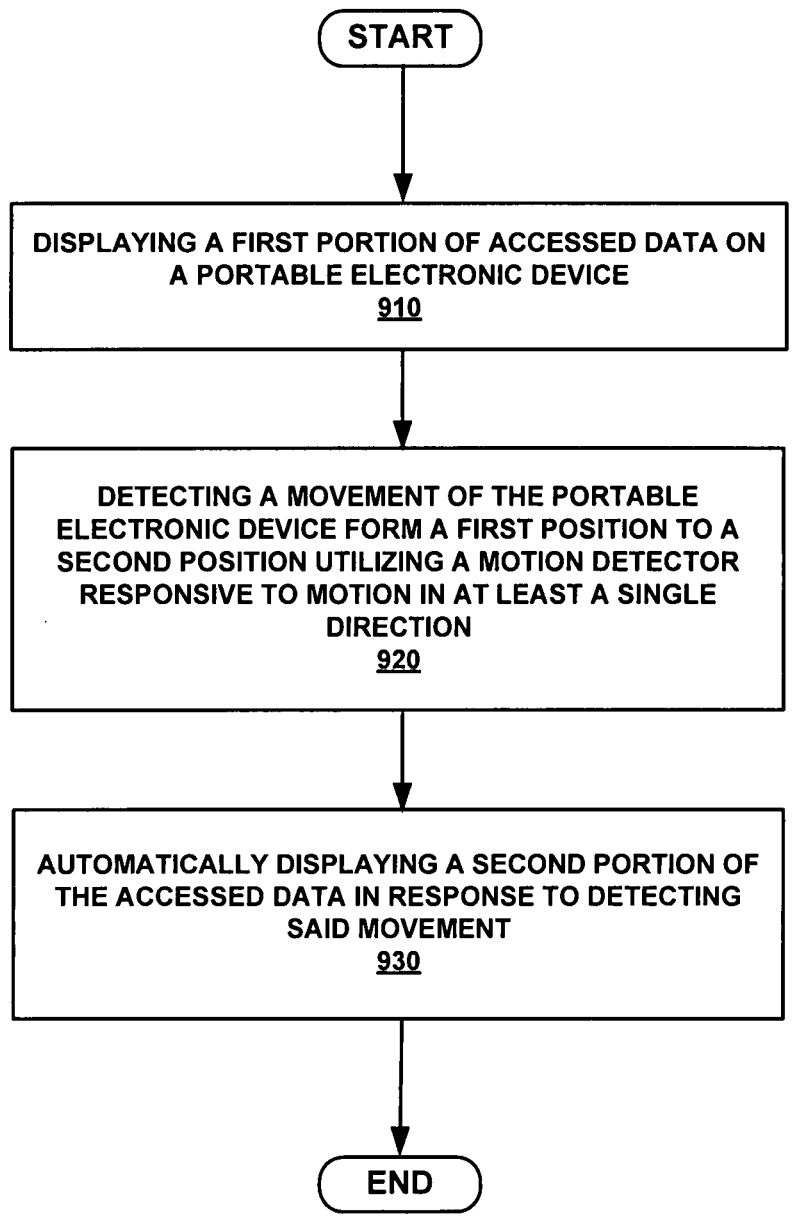
FIG. 9 is a flowchart of a method for displaying data on a portable electronic device in accordance with embodiments of the present invention.

FIG. 9 is a flowchart of a method for displaying data on a portable electronic device in accordance with embodiments of the present invention. In step 910 of FIG. 9, a first portion of accessed data is displayed on an electronic device. With reference again to FIG. 6B, first portion 620a of data 620 is displayed. In embodiments of the present invention, first portion 620a is displayed due to constraints upon the viewable area which may be imposed by the screen size of the display device used by portable electronic device 400.

In step 920 of FIG. 9, a movement of the portable electronic device from a first portion to a second position is detected utilizing a motion detector responsive to motion in at least a single direction. As described above, embodiments of the present invention use a motion detecting component (e.g., 425) to detect a change in the motion of portable electronic device 400. In embodiments of the present invention, motion detecting component 425 is an accelerometer operable for determining motion of portable electronic device 400 in at least one plane of motion which are conventionally defined as an X, Y, and Z axis (e.g., 605a, 605b, and 605c of FIG. 6A). Thus, when portable electronic device 400 is moved from a first position (e.g., 601 of FIG. 6A) to a second position (e.g., 602 of FIG. 6A), motion detecting component 425 determines a vector between those two positions.

In step 930 of FIG. 9, a second portion of the accessed data is automatically displayed in response to detecting the movement. As described above with reference to FIG. 6B, in response to determining the vector described above (e.g., 605 of FIG. 6A), correlator 720 determines a vector (e.g., 330 of FIG. 6B) which originates at first portion 620a. The direction of vector 330 is representative of the vector (e.g., 605) that is created when portable electronic device 400 is moved from first position 601 to second position 602. The magnitude of vector 330 is scaled to be a fraction of the magnitude of vector 605. In so doing, when portable electronic device is moved to second position 602, display device 406 displays second portion 620b of data 620.

Embodiments of the present invention, an accelerometer based extended display, are thus described. While the present invention has been described in particular embodiments, it should be appreciated that the present invention should not be construed as limited by such embodiments, but rather construed according to the below claims.

What is claimed is:

1. A method for displaying data on a portable electronic device, said method comprising:
    displaying a first portion of accessed data on said portable electronic device;
    utilizing a geographic position receiver to receive a first geographic position of said portable electronic device;
    utilizing an accelerometer to detect a movement of said portable electronic device from a first position to a second position utilizing a motion detector responsive to motion in at least a single direction;
    determining a vector between said first position of said portable electronic device and said second position of said portable electronic device;
    determining said second portion of the accessed data based upon said determining of said vector;
    correlating said first position with said first portion of the accessed data;
    determining a second vector from said first portion of the accessed data which correlates said second position with said second portion of the accessed data;
    determining a second geographic position of said portable electronic device based upon said vector and said first geographic position; and
    automatically displaying a second portion of the accessed data in response to detecting said movement.

2. The method as recited in claim 1 wherein said detecting further comprises:
    utilizing a motion sensing device which is removably coupleable with said portable electronic device.

3. The method as recited in claim 1 further comprising:
    using a position determining component for determining a first geographic position of said portable electronic device.

4. The method as recited in claim 1 further comprising:
    determining an orientation of said portable electronic device relative to the Earth's surface; and
    displaying a second instance of accessed data in response to detecting the movement of said portable electronic device from an essentially horizontal orientation to an essentially vertical orientation.

5. The method as recited in claim 3 further comprising:
    determining an azimuth from said portable electronic device to an object; and identifying said object based upon said first geographic position and said azimuth.

6. The method as recited in claim 4 wherein said displaying a second instance of accessed data further comprises;
    displaying data about said object when said portable electronic device is moved to said essentially vertical orientation.

7. The method as recited in claim 5 wherein said displaying said second instance of accessed data comprises displaying an image of said object.

8. The method as recited in claim 1 further comprising;
    automatically initiating the shutting down of said portable electronic device in response to detecting movement of said portable electronic device in excess of a pre-determined parameter.

9. The method as recited in claim 1 further comprising:
    verifying said movement as a valid input event.

10. The method as recited in claim 1 further comprising:
    identifying a reset position of said accessed data; and
    displaying said accessed data at said reset position.

11. An electronic data accessing system comprising:
    a geographic position input signal receiver coupled with a position determining component and with a navigation controller, said geographic position receiver for receiving a first geographic position of said portable electronic device;
    a motion input detector comprising an accelerometer, said motion input detector configured to generate a motion input signal in response to detecting movement of the portable electronic device from a first position to a second position;
    a motion input signal receiver coupled to said motion input detector and which receives said motion input signal;
    a correlator coupled with said motion signal receiver for correlating a first portion of an instance of accessed data with said first position and a second portion of said instance of accessed data with said second position; and
    a data accessor coupled to said correlator and coupled to a output display generator, said data accessor for causing said second portion of said instance of accessed data to be displayed via said output display generator.

12. The electronic data accessing system of claim 11 wherein said motion input detector is removably coupled with said portable electronic device.

13. The electronic data accessing system of claim 11 wherein said motion input detector is further for indicating a vector between said first position and said second position and wherein said correlator determines said second portion of said instance of accessed data based upon said vector.

14. The electronic data accessing system of claim 13 wherein said navigation controller further comprises a position deriver which determines a second geographic position of said portable electronic device based upon said vector and said first geographic position.

15. The electronic data accessing system of claim 13 further comprising:
    an orientation signal receiver coupled with an orientation determining device and with said data accessor, said orientation signal receiver for receiving an indication of the movement of said portable electronic device from an essentially horizontal orientation to an essentially vertical orientation.

16. The electronic data accessing system of claim 14 further comprising:
    an azimuth signal receiver coupled with an azimuth determination component and with said navigation controller, said azimuth signal receiver for receiving an indication of an azimuth from said portable electronic device to an object, and
    an object identification component coupled with said navigation controller, said object identification component for identifying said object based upon said first geographic position and said azimuth.

17. The electronic data accessing system of claim 15 wherein said data accessor is further coupled to said orientation signal receiver and to said object identification component, and wherein said data accessor accesses a second instance of data about said object in response to a signal indicating that said portable electronic device has been moved to said essentially vertical orientation.

18. The electronic data accessing system of claim 16 wherein said second instance of data comprises an image of said object.

19. The electronic data accessing system of claim 11 further comprising:
   a shut-down initiator coupled with said motion input signal receiver, said shut-down initiator for initiating a shut-down routine in response to receiving a motion input signal indicating movement of said portable electronic device in excess of a pre-determined parameter.

20. The electronic data accessing system of claim 11 further comprising:
   an input verifier bus for verifying a movement of said portable electronic device as a valid input event.

21. The electronic data accessing system of claim 11 further comprising:
   a reset initiator for causing said display device to display a designated reset portion of said accessed data.

* * * * *